(12) United States Patent
Saigusa et al.

(10) Patent No.: US 12,386,111 B2
(45) Date of Patent: Aug. 12, 2025

(54) OPTICAL ELEMENT, AND METHOD OF PRODUCING OPTICAL ELEMENT

(71) Applicant: Sharp Display Technology Corporation, Kameyama (JP)

(72) Inventors: Ryosuke Saigusa, Kameyama (JP); Yuichi Kawahira, Kameyama (JP); Akira Sakai, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/525,939

(22) Filed: Dec. 1, 2023

(65) Prior Publication Data
US 2024/0241300 A1    Jul. 18, 2024

(30) Foreign Application Priority Data

Jan. 12, 2023   (JP) .................................. 2023-003199

(51) Int. Cl.
*G02B 5/30* (2006.01)
*G02F 1/13363* (2006.01)

(52) U.S. Cl.
CPC ..... *G02B 5/3016* (2013.01); *G02F 1/133636* (2013.01)

(58) Field of Classification Search
CPC ..................... G02B 5/3016; G02F 1/133636
See application file for complete search history.

(56) References Cited

U.S. PATENT DOCUMENTS 6,512,563 B1 *   1/2003   Tajima .............. G02F 1/133753
                                                            359/254
2021/0011319 A1 *   1/2021   Sato ...................... G02B 6/005

FOREIGN PATENT DOCUMENTS

JP             9-197363 A      7/1997

* cited by examiner

*Primary Examiner* — Nathanael R Briggs
(74) *Attorney, Agent, or Firm* — Keating & Bennett, LLP

(57) ABSTRACT

Provided are an optical element that has a high diffraction efficiency and can be produced through a simple procedure, a method of producing the optical element, and a mask set for use in production of the optical element. The optical element of the present invention includes an optically anisotropic layer containing anisotropic molecules. The optically anisotropic layer includes a first region that is a region where the anisotropic molecules are not twist-aligned in a film thickness direction of the optically anisotropic layer, and a second region that is a region where the anisotropic molecules are twist-aligned in the film thickness direction of the optically anisotropic layer.

5 Claims, 31 Drawing Sheets

First exposure step

Absorption axis of second polarizing plate (110°)

—— Molecular alignment used in calculation
------ Ideal molecular alignment

—— Molecular alignment used in calculation
------ Ideal molecular alignment

OPTICAL ELEMENT, AND METHOD OF PRODUCING OPTICAL ELEMENT

CROSS-REFERENCE TO RELATED APPLICATIONS

The present application claims priority under 35 U.S.C. § 119 to Japanese Patent Application No. 2023-003199 filed on Jan. 12, 2023, the contents of which are incorporated herein by reference in their entirety.

BACKGROUND OF THE INVENTION

Field of the Invention

The present disclosure relates to optical elements, methods of producing an optical element, and mask sets. Specifically, the present disclosure relates to an optical element, a method of producing the optical element, and a mask set for use in production of the optical element.

Description of Related Art

There have been suggestions to use an optical system including an optical element such as a Pancharatnam-Berry phase optical element (PBOE) in a head-mounted display or other display devices. A PBOE includes, for example, an optically anisotropic layer formed from a liquid crystal composition containing liquid crystal molecules.

Examples of the PBOE include a light modulator disclosed in JP H09-197363 A. This light modulator includes a liquid crystal cell that includes concentrically distributed regions each containing liquid crystals, wherein the alignment states of the liquid crystals in the regions vary periodically from the central region toward the circumference region, and the period of change also varies from the center toward the circumference.

BRIEF SUMMARY OF THE INVENTION

It is important for a PBOE to have a periodic, continuous molecular alignment pattern in the plane to achieve a high diffraction efficiency. In the case of fabricating a PBOE through mask exposure, while a periodic pattern can be achieved in the plane, the alignment in the plane cannot usually be continuous but becomes discrete, which deteriorates the optical performance.

FIG. 43 is a schematic view showing a method of measuring diffraction efficiency of a PBOE of a comparative embodiment. FIG. 44 is a graph of the relationship between the type of molecular alignment and the diffraction efficiency of the PBOE of the comparative embodiment. Here, the diffraction efficiency represents the proportion of principal light in transmission light. FIG. 45 shows a polarizing micrograph of the PBOE of the comparative embodiment having 8 types of molecular alignments and a schematic cross-sectional view of a mask required in production of the PBOE.

As shown in FIG. 43 and FIG. 44, in a case where the PBOE 10R of the comparative embodiment is produced in a discrete molecular alignment pattern, the greater the number of types of molecular alignment directions, the higher the lens performance. Since the molecular alignment achieved through mask exposure is discrete, typically, the number of types of molecular alignments equals the number of masks. For example, production of the PBOE 10R of the comparative embodiment having 8 types of molecular alignments requires irradiation with 8 types of polarized UV lights through 8 masks as shown in FIG. 45. Thus, an increase in number of masks usually increases the number of types of molecular alignments to bring the in-plane discrete alignment closer to continuous alignment. Such an increase in number of masks in the method leads to disadvantages such as an increase in cost and an increase in number of production steps.

FIG. 46 is a schematic plan view of the optical element of JP H09-197363 A. In production of the light modulator in JP H09-197363 A, first, solid electrodes are formed from indium tin oxide (ITO) on the surfaces of the two respective glass substrates. Then, polyimide films are formed on the respective solid electrodes. The polyimide films are each rubbed by a mask rubbing method such that, as shown by regions R1, R2, and R3 in FIG. 46, alignment direction angles of 0°, 45°, and 90° are periodically distributed from the central region toward the circumferential region in the glass substrate. The two glass substrates are then overlaid with each other, between which liquid crystals are then vacuum-injected. In order to achieve an optical element having a high diffraction efficiency by the method of JP H09-197363 A, more rubbing processes are required, which increases the production cost, for example. It is difficult to produce an optical element having a high diffraction efficiency through a simple procedure by the method of JP H09-197363 A.

In response to the above issues, an object of the present invention is to provide an optical element that has a high diffraction efficiency and can be produced through a simple procedure, a method of producing the optical element, and a mask set for use in production of the optical element.

(1) One embodiment of the present invention is directed to an optical element including an optically anisotropic layer containing anisotropic molecules, the optically anisotropic layer including a first region that is a region where the anisotropic molecules are not twist-aligned in a film thickness direction of the optically anisotropic layer, and a second region that is a region where the anisotropic molecules are twist-aligned in the film thickness direction of the optically anisotropic layer.

(2) In an embodiment of the present invention, the optical element includes the structure (1), the optically anisotropic layer further includes a third region that is a region where the anisotropic molecules are not twist-aligned in the film thickness direction of the optically anisotropic layer in addition to the first region and the second region, and the first region, the second region, and the third region are arranged in the stated order from a central portion to an end portion of the optically anisotropic layer in a plan view.

(3) In an embodiment of the present invention, the optical element includes the structure (1), the optically anisotropic layer further includes a third region to an N-th region in addition to the first region and the second region, the first region to the N-th region are arranged in the stated order from a central portion to an end portion of the optically anisotropic layer in a plan view, a p-th region included in the first region to the N-th region is a region where the anisotropic molecules are not twist-aligned in the film thickness direction of the optically anisotropic layer, a (p+1)th region included in the first region to the N-th region is a region where the anisotropic molecules are twist-aligned in the film thickness direction of the optically anisotropic layer, N is an integer of 4 or greater, and p is an odd number of 1 or greater and (N−1) or smaller.

(4) In an embodiment of the present invention, the optical element includes the structure (1), (2), or (3), the region where the anisotropic molecules are not twist-aligned is a region where a difference between a front side molecular alignment and a back side molecular alignment in the optically anisotropic layer is 0° or more and less than 0.1°, and the region where the anisotropic molecules are 10 twist-aligned is a region where a difference between the front side molecular alignment and the back side molecular alignment of the optically anisotropic layer is 0.1° or more.

(5) In an embodiment of the present invention, the optical element includes the structure (1), (2), (3), or (4), and the first region and the second region are arranged in an annular pattern.

(6) In an embodiment of the present invention, the optical element includes the structure (1), (2), (3), (4), or (5), and the optical element is a Pancharatnam-Berry phase optical element.

(7) Another embodiment of the present invention is directed to an optical element including an optically anisotropic layer containing anisotropic molecules, the optically anisotropic layer including a first region that is a region having a depolarization property, and a second region that is a region having a higher depolarization property than the first region.

(8) In an embodiment of the present invention, the optical element includes the structure (7), the optically anisotropic layer further includes a third region that is a region having a lower depolarization property than the second region in addition to the first region and the second region, and the first region, the second region, and the third region are arranged in the stated order from a central portion to an end portion of the optically anisotropic layer in a plan view.

(9) In an embodiment of the present invention, the optical element includes the structure (7), the optically anisotropic layer further includes a third region to an N-th region in addition to the first region and the second region, the first region to the N-th region are arranged in the stated order from a central portion to an end portion of the optically anisotropic layer in a plan view, a p-th region included in the first region to the N-th region is a region having a first depolarization property, a (p+1)th region included in the first region to the N-th region is a region having a second depolarization property higher than the first depolarization property, N is an integer of 4 or greater, and p is an odd number of 1 or greater and (N−1) or smaller.

(10) In an embodiment of the present invention, the optical element includes the structure (7), (8), or (9), and the first region and the second region are arranged in an annular pattern.

(11) In an embodiment of the present invention, the optical element includes the structure (7), (8), (9), or (10), and the depolarization property is a difference in contrast ratio between a region in question and a central portion of the optically anisotropic layer.

(12) In an embodiment of the present invention, the optical element includes the structure (7), (8), (9), (10) or (11), and the optical element is a Pancharatnam-Berry phase optical element.

(13) Yet another embodiment of the present invention is directed to a method of producing an optical element, including: an exposure step of exposing an alignment film on a supporting substrate to light for alignment treatment; and a liquid crystal layer formation step of disposing a polymerizable liquid crystal material on the exposed alignment film and curing the polymerizable liquid crystal material, the exposure step sequentially comprising: a first exposure step of exposing a first exposure region in the alignment film to first polarized light with a first polarization axis; and a second exposure step of exposing a second exposure region in the alignment film consisting of a region overlapping only part of the first exposure region and a region not overlapping the first exposure region to second polarized light with a second polarization axis that lies at a different angle from the first polarization axis.

(14) In an embodiment of the present invention, the method includes the process (13), the exposure step sequentially comprises the first exposure step and the second exposure step to an M-th exposure step, the first exposure step to the M-th exposure step respectively expose the first exposure region to an M-th exposure region in the alignment film to the first polarized light to M-th polarized light respectively having the first polarization axis to an M-th polarization axis, the first polarization axis to the M-th polarization axis lie at angles different from one another, part of an r-th exposure region included in the first exposure region to the M-th exposure region overlaps an (r−1)th exposure region while the other part of the r-th exposure region does not overlap the (r−1)th exposure region, part of the (r−1)th exposure region included in the first exposure region to the M-th exposure region overlaps the r-th exposure region while the other part of the (r−1)th exposure region does not overlap the r-th exposure region, the r-th exposure region does not overlap the first exposure region to an (r−2)th exposure region, M is an integer of 3 or greater, and r is an integer of 3 or greater and M or smaller.

(15) In an embodiment of the present invention, the method includes the process (13) or (14), and the method of producing an optical element is a method of producing a Pancharatnam-Berry phase optical element.

(16) Yet another embodiment of the present invention is directed to a mask set including: a first mask that includes a first light-transmitting portion and a first light-blocking portion; and a second mask that includes a second light-transmitting portion and a second light-blocking portion, wherein in a state where the first mask and the second mask are overlaid with each other with a center of the first mask and a center of the second mask coinciding with each other, the first light-transmitting portion overlaps part of the second light-transmitting portion and part of the second light-blocking portion, and the second light-transmitting portion overlaps part of the first light-transmitting portion and part of the first light-blocking portion.

(17) In an embodiment of the present invention, the mask set includes the structure (16), and the mask set is for use in production of a Pancharatnam-Berry phase optical element.

The present invention can provide an optical element that has a high diffraction efficiency and can be produced through a simple procedure, a method of producing the optical element, and a mask set for use in production of the optical element.

DETAILED DESCRIPTION OF THE INVENTION

Hereinafter, embodiments of the present invention are described. The present invention is not limited to the contents of the following embodiments. The design may be modified as appropriate within the range satisfying the configuration of the present invention. In the following description, components having the same or similar functions in different drawings are commonly provided with the same reference sign so as to appropriately avoid repetition of description. The structures in the present invention may be combined as appropriate without departing from the gist of the present invention.

Embodiment 1

Figure 1:
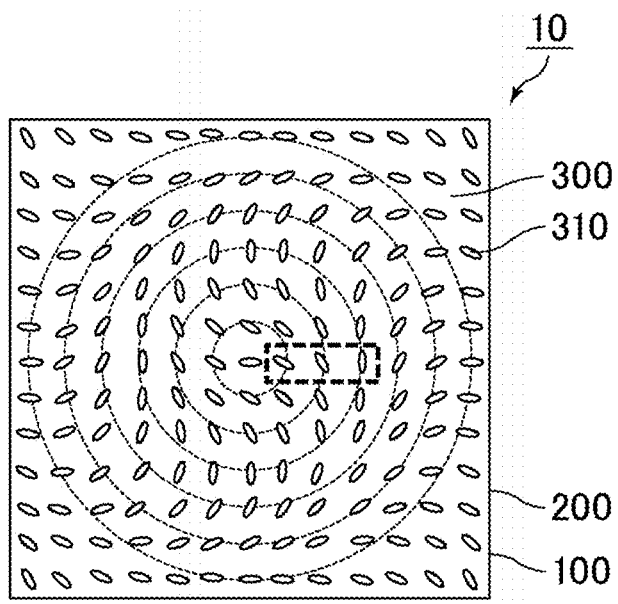
FIG. 1 is a schematic plan view of an optical element of Embodiment 1.
Figure 2:
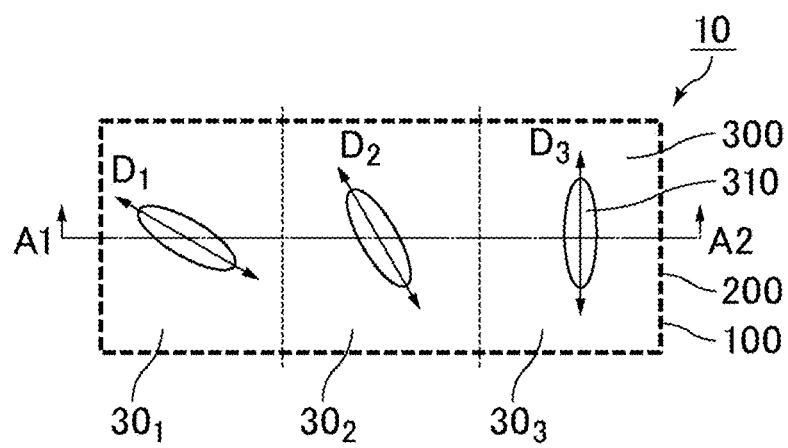
FIG. 2 is a schematic plan view of the optical element of Embodiment 1 with a focus on a region surrounded by the dashed line in FIG. 1.
Figure 3:
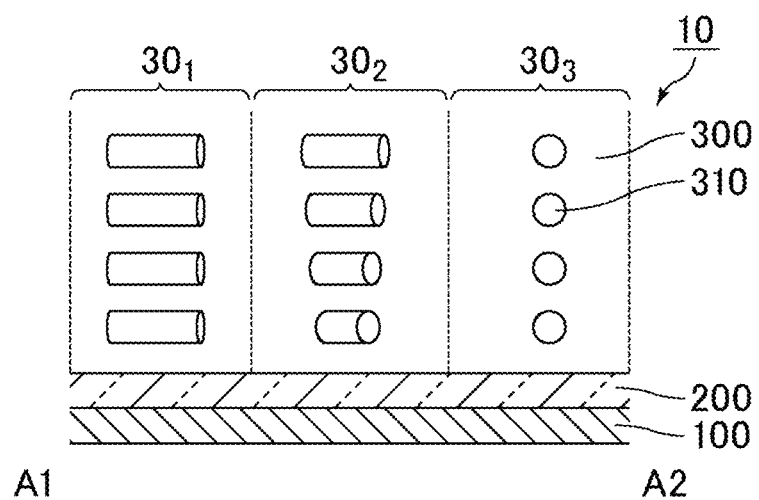
FIG. 3 is a schematic cross-sectional view of the optical element of Embodiment 1 taken along the A1-A2 line in FIG. 2.

FIG. 1 is a schematic plan view of an optical element of Embodiment 1. FIG. 2 is a schematic plan view of the optical element of Embodiment 1 in a region surrounded by the dashed line in FIG. 1. FIG. 3 is a schematic cross-sectional view of the optical element of Embodiment 1 taken along the A1-A2 line in FIG. 2.

An optical element 10 of the present embodiment shown in FIG. 1 to FIG. 3 includes an optically anisotropic layer 300 containing anisotropic molecules 310. The optically anisotropic layer 300 includes a first region $30_1$ that is a region where the anisotropic molecules 310 are not twist-aligned in the film thickness direction of the optically anisotropic layer 300 and a second region $30_2$ that is a region where the anisotropic molecules 310 are twist-aligned in the film thickness direction of the optically anisotropic layer 300. This structure can align the anisotropic molecules 310 in a continuous, periodic pattern in the plane, enabling a high diffraction efficiency. The optical element 10 having such a structure, for example, can be produced without an increase in the number of masks as described below, and thus can be produced through a simple procedure.

Although interference lithography can be used to align the anisotropic molecules in a continuous, periodic pattern, mass production is difficult with this method, and thus optical elements cannot be produced through a simple procedure. Meanwhile, in the case of aligning anisotropic molecules through mask exposure, the resulting alignment pattern is discrete. This method produces a difference between a continuous, periodic alignment pattern and an alignment pattern achievable through mask exposure, thus lowering the diffraction efficiency (optical performance).

In order to align anisotropic molecules in a continuous, periodic pattern by the method disclosed in JP H09-197363 A, the number of rubbing treatments needs to be increased. Thus, optical elements having a high diffraction efficiency cannot be produced through a simple procedure by the method disclosed in JP H09-197363 A.

In contrast, the optical element 10 of the present embodiment can exhibit enhanced optical performance as the discrete alignment of anisotropic molecules is brought closer to a continuous alignment without an increase in the number of masks.

Figure 4A:
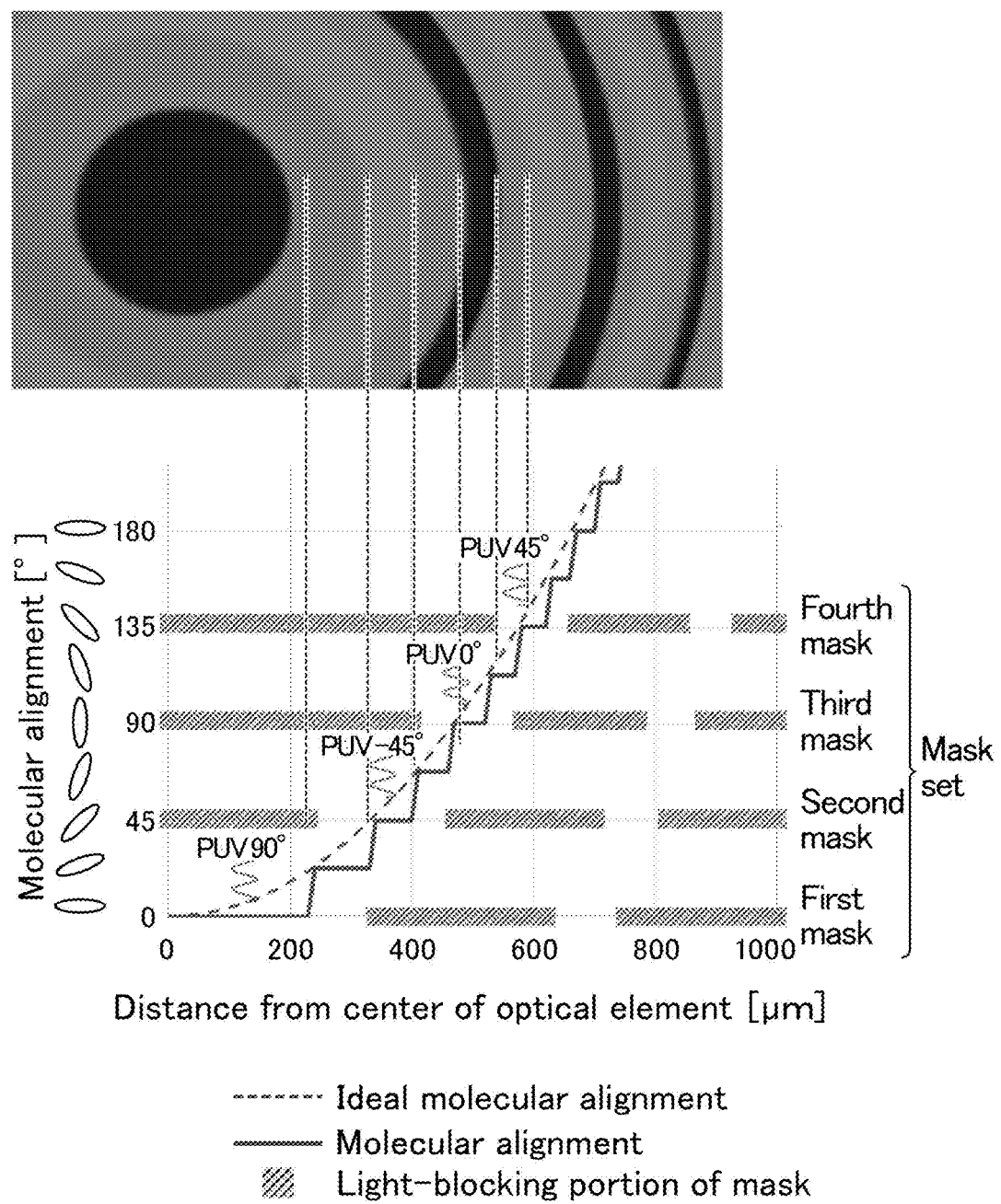
FIG. 4A shows a polarizing micrograph of an example of the optical element of Embodiment 1 and a schematic cross-sectional view of masks required in production of the optical element.
Figure 4B:
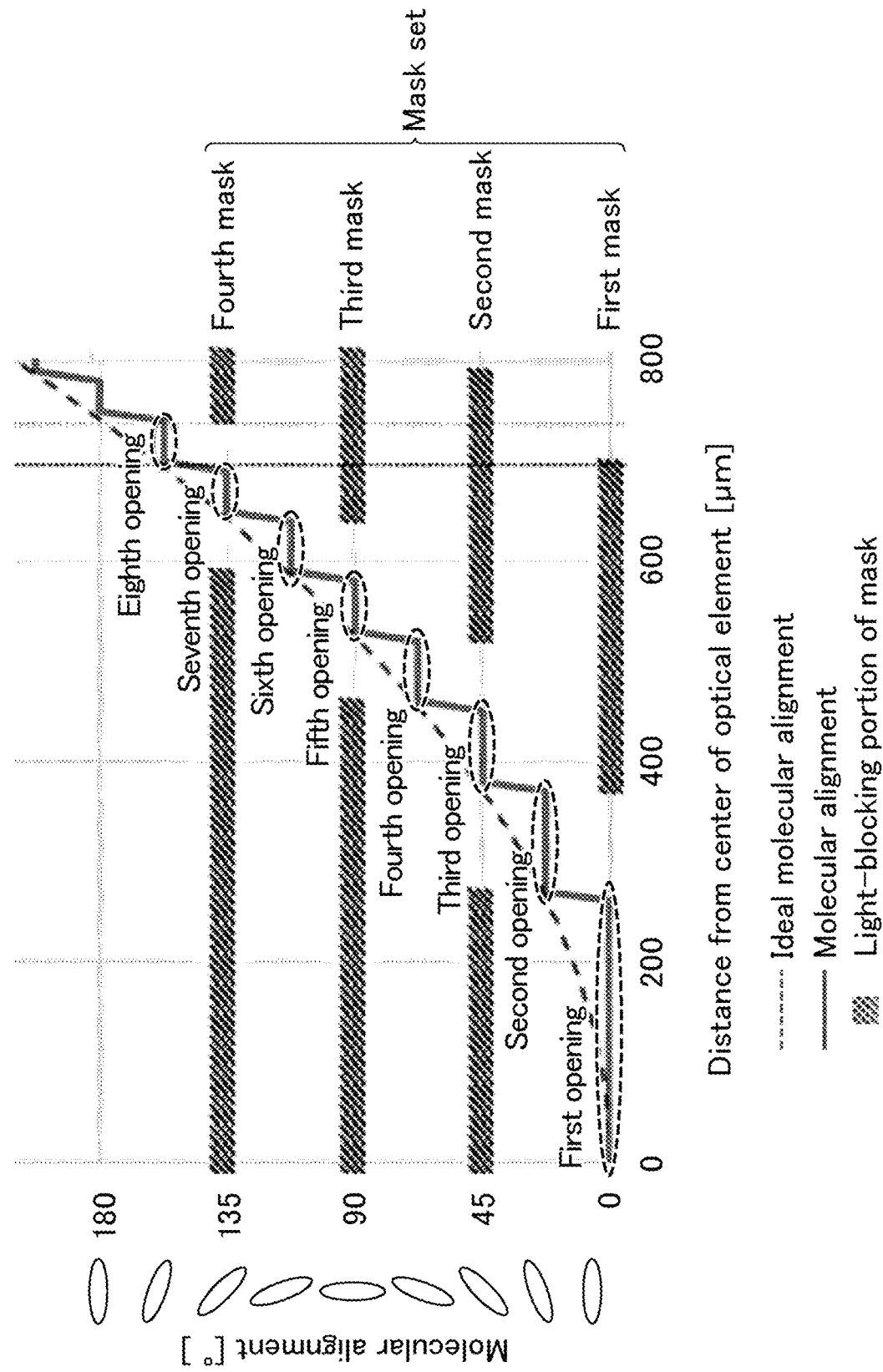
FIG. 4B is an enlarged schematic cross-sectional view enlarged along the horizontal axis of the schematic cross-sectional view of masks in FIG. 4A.

In the present embodiment, as shown in FIG. 2 and FIG. 3, a focus was placed on that the alignment regulating force works in a direction different from the directions of polarization when the same region in a photoalignment film is irradiated multiple times with different polarized UV lights (also referred to as PUV lights). This phenomenon can be used to achieve, as shown in FIG. 4A and FIG. 4B, the relationship "(number of types of molecular alignment directions)>(number of masks)". This enables production of an optical element 10 (PBOE) exhibiting higher performance (higher diffraction efficiency) with fewer masks than conventional methods. The multi-exposure in the present embodiment is used to achieve 8 types of molecular alignments with 4 masks in FIG. 4A and FIG. 4B. FIG. 4A shows a polarizing micrograph of an example of the optical element of Embodiment 1 and a schematic cross-sectional view of masks required in production of the optical element. FIG. 4B is an enlarged schematic cross-sectional view enlarged along the horizontal axis of the schematic cross-sectional view of masks in FIG. 4A.

For example, the following exposure steps are sequentially performed with the masks shown in FIG. 4A and FIG. 4B: a first exposure step of irradiating a photoalignment film with polarized UV light having its polarization axis at 0° through a first mask; a second exposure step of irradiating the photoalignment film with polarized UV light having its polarization axis at 45° through a second mask; a third exposure step of irradiating the photoalignment film with polarized UV light having its polarization axis at 90° through a third mask; and a fourth exposure step of irradiating the photoalignment film with polarized UV light having its polarization axis at 135° through a fourth mask. This structure sets, in a plan view, the molecular alignment to 0° in a region (of the photoalignment film) corresponding to the first aperture defined by the light-transmitting portion of the first mask and not by the light-transmitting portions of the other masks. The structure also sets, in a plan view, the molecular alignment to 22.5° in a region corresponding to the second aperture defined by the light-transmitting portion of the first mask and the light-transmitting portion of the second mask. The structure also sets, in a plan view, the molecular alignment to 45° in a region corresponding to the third aperture defined by the light-transmitting portion of the second mask and not by the light-transmitting portions of the other masks. The structure also sets, in a plan view, the molecular alignment to 67.5° in a region corresponding to the fourth aperture defined by the light-transmitting portion of the second mask and the light-transmitting portion of the third mask. The structure also sets, in a plan view, the molecular alignment to 90° in a region corresponding to the fifth aperture defined by the light-transmitting portion of the third mask and not by the light-transmitting portions of the other masks. The structure also sets, in a plan view, the molecular alignment to 112.5° in a region corresponding to the sixth aperture defined by the light-transmitting portion of the third mask and the light-transmitting portion of the fourth mask. The structure also sets, in a plan view, the molecular alignment to 135° in a region corresponding to the seventh aperture defined by the light-transmitting portion of the fourth mask and not by the light-transmitting portions of the other masks. The structure also sets, in a plan view, the molecular alignment to 157.5° in a region corresponding to the eighth aperture defined by the light-transmitting portion of the fourth mask and the light-transmitting portion of the first mask.

A region where the anisotropic molecules 310 are not twist-aligned in the film thickness direction of the optically anisotropic layer 300 is a region where, for example, the difference between the front side molecular alignment (angle of alignment) and the back side molecular alignment in the optically anisotropic layer 300 is 0° or more and less than 0.1°. A region where the anisotropic molecules 310 are twist-aligned in the film thickness direction of the optically anisotropic layer 300 is a region where, for example, the difference between the front side molecular alignment (angle of alignment) and the back side molecular alignment in the optically anisotropic layer 300 is 0.1° or more. The upper limit of the difference between the front side molecular alignment (angle of alignment) and the back side molecular alignment in the optically anisotropic layer 300 is not limited in a region where the anisotropic molecules 310 are twist-aligned in the film thickness direction of the optically anisotropic layer 300. For example, the difference between the front side molecular alignment (angle of alignment) and the back side molecular alignment in the optically anisotropic layer 300 is 0.1° or more and 5° or less, preferably 0.1° or more and 1° or less.

Hereinbelow, the optical element 10 of the present embodiment is described in detail.

The optical element 10 of the present embodiment shown in FIG. 1 to FIG. 3 sequentially includes a supporting substrate 100, an alignment film 200, and an optically anisotropic layer 300. As shown in FIG. 1, the first region $30_1$ and the second region $30_2$ are arranged in an annular pattern. Specifically, the first region $30_1$ and the second region $30_2$ in a plan view are arranged in an annular pattern. The optical element 10 of the present embodiment is a Pancharatnam-Berry phase optical element. The Pancharatnam-Berry phase optical element has a function of causing circularly polarized light to converge and diverge.

Examples of the supporting substrate 100 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The alignment film 200 has a function of regulating the alignment of the anisotropic molecules 310 in the optically anisotropic layer 300. Examples of the material for the alignment film 200 include materials commonly used in the field of liquid crystal panels, such as a polymer with a polyimide structure in its main chain, a polymer with a polyamic acid structure in its main chain, and a polymer with a polysiloxane structure in its main chain. The alignment film 200 can be formed by applying an alignment film material. The application method can be any method such as flexographic printing or inkjet coating.

The alignment film 200 is preferably a photoalignment film. The photoalignment film can be formed, for example, by applying to a substrate an alignment film material containing a photo-alignment polymer with a photo-functional group. The alignment film 200 is subjected to alignment treatment. For example, the alignment treatment is performed by irradiating the alignment film 200 containing a photo-alignment polymer with polarized UV light to make the surface of the alignment film 200 anisotropic.

Examples of the photo-alignment polymer include photo-alignment polymers containing at least one photo-functional group selected from the group consisting of cyclobutane, azobenzene, chalcone, cinnamate, coumarin, stilbene, phenol ester, and phenyl benzoate groups. The photo-alignment polymer contained in the photo-alignment layer may be one kind or two kinds or more. The photo-functional group contained in the photo-alignment polymer may be located in the main chain, in a side chain, or in both of the main chain and a side chain of the polymer.

The photo-alignment polymer may cause any type of photo-reaction and preferred examples of the polymer include a photolysis polymer, a photo-rearranging polymer (preferably, a photo-Fries rearranging polymer), a photoisomerizable polymer, a photodimerizable polymer, and a photo-crosslinking polymer. Any of these may be used alone or in combination of two or more thereof. In terms of the alignment stability, particularly preferred among these are a photolysis polymer having a reaction wavelength (main sensitive wavelength) around 254 nm and a photo-rearranging polymer having a reaction wavelength (main sensitive wavelength) around 254 nm. Also preferred are a photoisomerizable polymer containing a photo-functional group in a side chain and a photodimerizable polymer containing a photo-functional group in a side chain.

The photo-alignment polymer may have any main chain structure, and suitable examples of the main chain structure include a polyamic acid structure, a polyimide structure, a poly(meth)acrylic acid structure, a polysiloxane structure, a polyethylene structure, a polystyrene structure, and a polyvinyl structure.

The alignment film 200 may be a horizontal alignment film that aligns the anisotropic molecules 310 substantially horizontally to the film surface, or may be a vertical alignment film that aligns the anisotropic molecules 310 substantially vertically to the film surface. The horizontal alignment film, with no voltage applied, has a function of aligning the anisotropic molecules 310 in the optically anisotropic layer 300 horizontally to the surface of the horizontal alignment film. Here, the expression "aligning the anisotropic molecules horizontally to the surface of the horizontal alignment film" means that the pre-tilt angle of the anisotropic molecules is from 0° to 5°, preferably from 0° to 2°, more preferably from 0° to 1°, to the surface of the horizontal alignment film. The vertical alignment film, with no voltage applied, has a function of aligning the anisotropic molecules 310 in the optically anisotropic layer 300 vertically to the surface of the vertical alignment film. The expression "aligning the anisotropic molecules vertically to the surface of the vertical alignment film" means that the pre-tilt angle of the anisotropic molecules is from 86° to 90°, preferably from 87° to 89°, more preferably from 87.5° to 89°, to the surface of the vertical alignment film. The pre-tilt angle of the anisotropic molecules means the angle at which the long axes of the liquid crystal molecules tilt relative to the main surface of each substrate with no voltage applied.

The optically anisotropic layer 300 contains the anisotropic molecules 310. The optically anisotropic layer 300 includes the first region $30_1$ where the anisotropic molecules 310 are not twist-aligned in the film thickness direction of the optically anisotropic layer 300 and the second region $30_2$ where the anisotropic molecules 310 are twist-aligned in the film thickness direction of the optically anisotropic layer 300.

Suitable as the optically anisotropic layer 300 is, for example, a cured product of a polymerizable liquid crystal material (also referred to as "reactive mesogens"). In this case, a polymerizable liquid crystal material in at least one of a polymerized state or an unpolymerized state corresponds to the anisotropic molecules 310. The polymerizable liquid crystal material is preferably a photopolymerizable liquid crystal material that can be cured when irradiated with light.

The optically anisotropic layer 300 can be formed by, for example, applying a polymerizable liquid crystal material (reactive mesogens) and curing the material. The polymerizable liquid crystal material used is a liquid crystalline polymer having a photoreactive group. Examples of the polymerizable liquid crystal material include polymers each having a structure with both a substituent (mesogen group) and a photoreactive group in its side chain and having an acrylate, methacrylate, maleimide, N-phenylmaleimide, or siloxane, or another structure in its main chain. The mesogen group may be a biphenyl group, a terphenyl group, a naphthalene group, a phenylbenzoate group, an azobenzene group, or a derivative of any of these groups. The photoreactive group may be a cinnamoyl group, a chalcone group, a cinnamylidene group, a β-(2-phenyl) acryloyl group, a cinnamic acid group, or a derivative of any of these groups. The polymer may be a homopolymer consisting of a single repeat unit or may be a copolymer consisting of two or more repeat units different in side chain structure. The copolymer encompasses all of alternating copolymers, random copolymers, graft copolymers. In the copolymer above, a side chain of at least one repeat unit has a structure including both the mesogen group and the photoreactive group, and a side chain of any other repeat unit may not have the mesogen group or the photoreactive group.

The polymerizable liquid crystal material may contain additives such as a photopolymerization initiator. Non-limiting examples of the photopolymerization initiator include conventionally known ones.

Examples of the solvent used for the polymerizable liquid crystal material include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxy butyl acetate, N-methyl pyrrolidone, and dimethylacetamide. Any of these may be used alone or two or more of these may be used in combination.

As shown in FIG. 2, the optically anisotropic layer 300 preferably has a molecular alignment in a first direction $D_1$ in the first region $30_1$ and a molecular alignment in a second direction $D_2$ different from the first direction $D_1$ in the second region $30_2$. This structure can align the anisotropic molecules 310 in a continuous, periodic pattern in the plane, enabling a higher diffraction efficiency. The molecular alignment means the front side molecular alignment in the optically anisotropic layer.

As shown in FIG. 2, the optically anisotropic layer 300 preferably has a third region $30_3$ that is a region where the anisotropic molecules 310 are not twist-aligned in the film thickness direction of the optically anisotropic layer 300 in addition to the first region $30_1$ and the second region $30_2$, and the first region $30_1$, the second region $30_2$, and the third region $30_3$ are arranged in the stated order from the central portion to the end portion of the optically anisotropic layer 300 in a plan view. This structure can align the anisotropic molecules 310 in a more continuous, periodic pattern in the plane, enabling a higher diffraction efficiency.

Preferably, the optically anisotropic layer 300 has a molecular alignment in the third direction $D_3$ in the third region $30_3$, and the first direction $D_1$, the second direction De, and the third direction $D_3$ are preferably different from one another. This structure enables an even higher diffraction efficiency.

Figure 5:
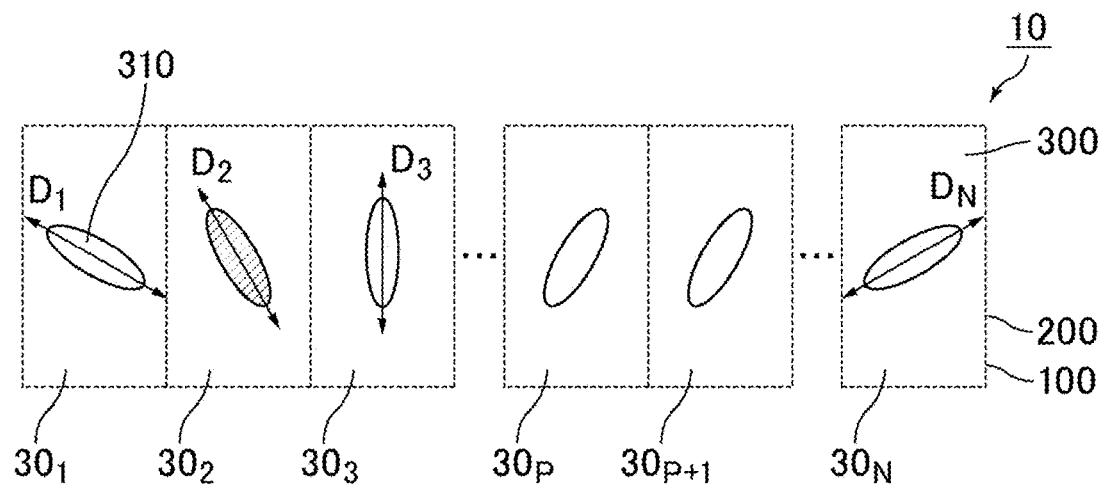
FIG. 5 is a schematic plan view of an example of the optical element of Embodiment 1.

FIG. 5 is a schematic plan view of an example of the optical element of Embodiment 1. As shown in FIG. 5, preferably, the optically anisotropic layer 300 includes a third region $30_3$ to an N-th region $30_N$ in addition to the first region $30_1$ and the second region $30_2$, the first region $30_1$ to the N-th region 30 are arranged in the stated order from the central portion toward the end portion of the optically anisotropic layer 300 in a plan view, a p-th region $30_p$ included in the first region $30_1$ to the N-th region $30_N$ is a region where the anisotropic molecules 310 are not twist-aligned in the film thickness direction of the optically anisotropic layer 300, a (p+1)th region $30_{p+1}$ included in the first region $30_1$ to the N-th region $30_N$ is a region where the anisotropic molecules 310 are twist-aligned in the film thickness direction of the optically anisotropic layer 300, where N is an integer of 4 or greater and p is an odd number of 1 or greater and (N−1) or smaller. This structure can align the anisotropic molecules 310 in a more continuous, periodic pattern in the plane, enabling a higher diffraction efficiency.

N is preferably an integer of 6 or greater. This structure can more effectively increase the diffraction efficiency. N is more preferably an integer of 8 or greater.

N is preferably an integer of 10 or smaller. This structure enables simpler production of the optical element 10.

N is preferably an integer of 4 or greater and 10 or smaller, more preferably an integer of 6 or greater and 10 or smaller, still more preferably an integer of 8 or greater and 10 or smaller.

Preferably, the optically anisotropic layer 300 has molecular alignments in the first direction $D_1$ to the N-th direction $D_N$ respectively in the first region $30_1$ to the N-th region $30_N$, and the first direction $D_1$ to the N-th direction $D_N$ are different from one another. This structure enables a higher diffraction efficiency.

In the case where the optically anisotropic layer 300 includes multiple non-twist-alignment regions, the difference between the front side molecular alignment and the back side molecular alignment may be constant or variable in the non-twist-alignment regions. In the case where the optically anisotropic layer 300 includes multiple twist-alignment regions, the difference between the front side molecular alignment and the back side molecular alignment may be constant or variable in the twist-alignment regions.

Next, the method of producing the optical element 10 of the present embodiment is described.

The method of producing the optical element 10 of the present embodiment includes an exposure step of exposing the alignment film 200 on the supporting substrate 100 to light for alignment treatment; and a liquid crystal layer formation step of disposing a polymerizable liquid crystal material on the exposed alignment film 200 and curing the polymerizable liquid crystal material, the exposure step sequentially including: a first exposure step of exposing a first exposure region in the alignment film 200 to first polarized light with a first polarization axis; and a second exposure step of exposing a second exposure region in the alignment film 200 consisting of a region overlapping only part of the first exposure region and a region not overlapping the first exposure region to second polarized light with a second polarization axis that lies at a different angle from the first polarization axis.

Figure 6:
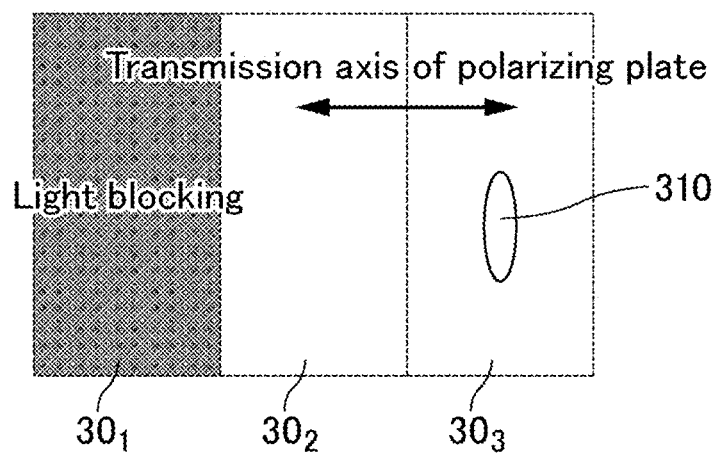
FIG. 6 is a schematic view of a first exposure step in a method of producing the optical element of Embodiment 1.
Figure 7:
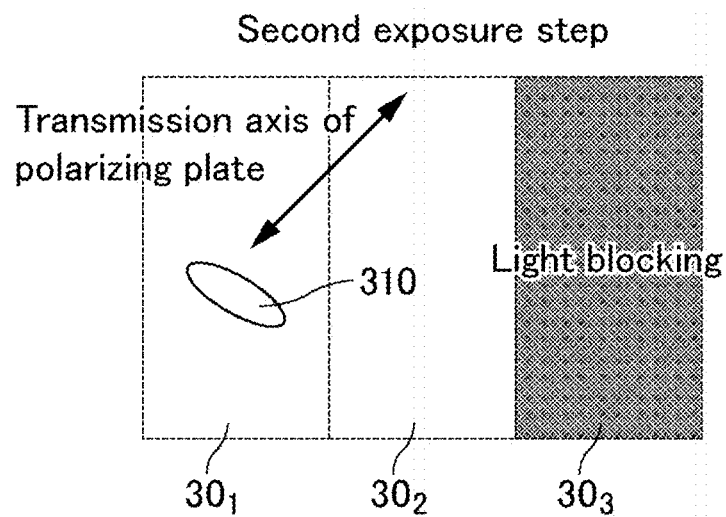
FIG. 7 is a schematic view of a second exposure step in the method of producing the optical element of Embodiment 1.
Figure 8:
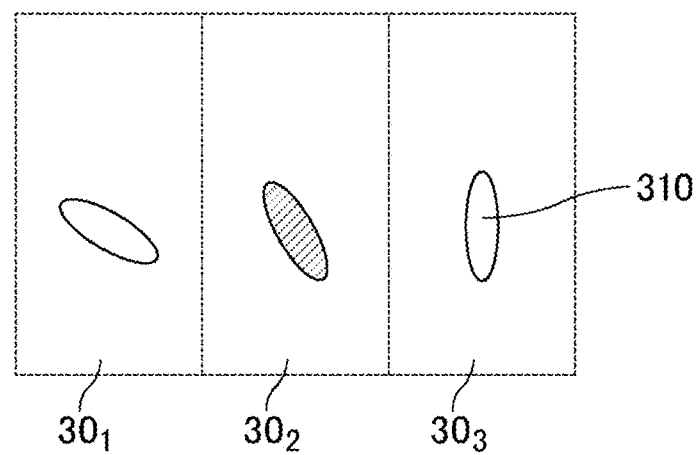
FIG. 8 is a schematic view of a state after the first exposure step and the second exposure step in the method of producing the optical element of Embodiment 1.

This structure enables exposure of the portion of the first exposure region not overlapping the second exposure region to only first polarized light, exposure of the portion of the second exposure region not overlapping the first exposure region to only second polarized light, and exposure of the portion of the first exposure region overlapping the second exposure region to both first polarized light and second polarized light. As shown in FIG. 6 to FIG. 8, the molecular alignment in the multi-exposed region is the average of the two exposures. Thus, the alignment direction of the alignment film 200 can be varied among the portion of the first exposure region not overlapping the second exposure region, the portion of the second exposure region not overlapping the first exposure region, and the portion of the first exposure region overlapping the second exposure region. In other words, exposure of the alignment film 200 to light twice imparts 3 types of alignment directions to the alignment film 200. As a result, the number of alignment patterns of the anisotropic molecules 310 can be increased with a fewer number of exposures, which enables simpler production of the optical element 10 having a high diffraction efficiency. For example, the optical element 10 having a high diffraction efficiency can be produced without an increase in the number of masks. FIG. 6 is a schematic view of the first exposure step in the method of producing the optical element of Embodiment 1. FIG. 7 is a schematic view of the second exposure step in the method of producing the optical element of Embodiment 1. FIG. 8 is a schematic view of a state after the first exposure step and the second exposure step in the method of producing the optical element of Embodiment 1.

For example, the portion of the first exposure region not overlapping the second exposure region corresponds to the first region $30_1$, the portion of the second exposure region not overlapping the first exposure region corresponds to the third region $30_3$, and the portion of the first exposure region overlapping the second exposure region, i.e., the multi-exposed region, corresponds to the second region $30_2$.

In JP H09-197363 A, the light modulator is produced by rubbing alignment treatment. In contrast, in the present embodiment, the optical element 10 is produced through multiple exposures, which is a method different from the method in JP H09-197363 A.

The method of producing the optical element 10 of the present embodiment may include, before the exposure step, an alignment film formation step of forming the alignment film 200 by applying an alignment film material containing a photo-alignment polymer with a photo-functional group to the supporting substrate 100. In the alignment film formation step, a coater such as a slit coater or a spin coater can be suitable for application of the alignment film material. The alignment film material, after being applied to a uniform thickness, for example, may be pre-baked at a temperature of about 70° C. to 100° C. for 1 to 10 minutes.

The exposure step is a step of exposing the alignment film 200 on the supporting substrate 100 to light for alignment treatment. The exposure step is performed, for example, using an exposure device that emits light (ultraviolet rays) with a wavelength of from 313 to 365 nm.

The exposure step sequentially includes a first exposure step of exposing a first exposure region in the alignment film 200 to first polarized light with a first polarization axis and a second exposure step of exposing a second exposure region in the alignment film 200 consisting of a region overlapping only part of the first exposure region and a region not overlapping the first exposure region to second polarized light with a second polarization axis that lies at a different angle from the first polarization axis.

Preferably, part of the first exposure region overlaps the second exposure region while the other part of the first exposure region does not overlap the second exposure region, and part of the second exposure region overlaps the first exposure region while the other part of the second exposure region does not overlap the first exposure region. This structure more effectively enables an increase in the number of alignment patterns of the anisotropic molecules 310 with a fewer number of exposures, thus enabling simpler production of the optical element 10 having a high diffraction efficiency.

The angle of the second polarization axis is greater than the angle of the first polarization axis preferably by 10° or more and 60° or less, more preferably by 20° or more and 50° or less, still more preferably by 30° or more and 45° or less. This structure enables more continuous variation of the alignment pattern of the anisotropic molecules 310, thus enabling production of the optical element 10 having a higher diffraction efficiency. The angle of an axis is measured positive in the counterclockwise direction.

The exposure step may sequentially include the first exposure step and the second exposure step to the M-th exposure step. The first exposure step to the M-th exposure step respectively expose the first exposure region to the M-th exposure region in the alignment film 200 to the first polarized light to the M-th polarized light respectively having the first polarization axis to the M-th polarization axis. The first polarization axis to the M-th polarization axis lie at angles different from one another.

Part of the r-th exposure region included in the first exposure region to the M-th exposure region overlaps the (r−1)th exposure region while the other part of the r-th exposure region does not overlap the (r−1)th exposure region. Part of the (r−1)th exposure region included in the first exposure region to the M-th exposure region overlaps the r-th exposure region while the other part of the (r−1)th exposure region does not overlap the r-th exposure region. The r-th exposure region does not overlap the first exposure region to the (r−2)th exposure region. M is an integer of 3 or greater. r is an integer of 3 or greater and M or smaller. This structure can more easily increase the number of alignment patterns of the anisotropic molecules 310, thus enabling simpler production of the optical element 10 having a high diffraction efficiency.

M is an integer of 3 or greater, preferably an integer of 4 or greater. M is preferably an integer of 7 or smaller, more preferably an integer of 6 or smaller. M is preferably an integer of 3 or greater and 7 or smaller, more preferably 4 or greater and 6 or smaller.

The angle of the r-th polarization axis is greater than the angle of the (r−1)th polarization axis preferably by 10° or more and 60° or less, more preferably by 20° or more and 50° or less, still more preferably by 30° or more and 45° or less. This structure can more continuously vary the alignment pattern of the anisotropic molecules 310, thus enabling production of the optical element 10 having a higher diffraction efficiency.

Specifically, when M is 3, the exposure step further includes a third exposure step after the second exposure step. The third exposure step is a step of exposing the third exposure region in the alignment film 200 to the third polarized light having the third polarization axis. The first polarization axis to the third polarization axis lie at angles different from one another. Part of the third exposure region overlaps the second exposure region while the other part of the third exposure region does not overlap the second exposure region. Part of the second exposure region overlaps the third exposure region while the other part of the second exposure region does not overlap the third exposure region. The third exposure region does not overlap the first exposure region.

The angle of the third polarization axis is greater than the angle of the second polarization axis preferably by 10° or more and 60° or less, more preferably by 20° or more and 50° or less, still more preferably by 30° or more and 45° or less. This structure can more continuously vary the alignment pattern of the anisotropic molecules 310, thus enabling production of the optical element 10 having a higher diffraction efficiency. The angle of an axis is measured positive in the counterclockwise direction.

When M is 4, the exposure step may further include the third exposure step and the fourth exposure step after the second exposure step. The third exposure step and the fourth exposure step are steps respectively expose the third exposure region and the fourth exposure region of the alignment film 200 to the third polarized light and the fourth polarized light respectively having the third polarization axis and the fourth polarization axis. The first polarization axis to the fourth polarization axis lie at angles different from one another. Part of the third exposure region overlaps the second exposure region while the other part of the third exposure region does not overlap the second exposure region. Part of the second exposure region overlaps the third exposure region while the other part of the second exposure region does not overlap the third exposure region. The third exposure region does not overlap the first exposure region. Part of the fourth exposure region overlaps the third exposure region while the other part of the fourth exposure region does not overlap the third exposure region. Part of the third exposure region overlaps the fourth exposure region while the other part of the third exposure region does not overlap the fourth exposure region. The fourth exposure region does not overlap the first exposure region and the second exposure region.

The angle of the fourth polarization axis is greater than the angle of the third polarization axis preferably by 10° or more and 60° or less, more preferably by 20° or more and 50° or less, still more preferably by 30° or more and 45° or less. This structure can more continuously vary the alignment pattern of the anisotropic molecules 310, thus enabling production of the optical element 10 having a higher diffraction efficiency. The angle of an axis is measured positive in the counterclockwise direction.

The liquid crystal layer formation step is a step of disposing a polymerizable liquid crystal material on the exposed alignment film 200 and curing the polymerizable liquid crystal material. In the liquid crystal layer formation step, the polymerizable liquid crystal material is disposed on the alignment film 200 by coating, for example. A coater such as a slit coater or a spin coater is suitable for the coating. The polymerizable liquid crystal material is cured using, for example, an exposure device that emits light (ultraviolet rays) having a wavelength of from 313 to 365 nm.

Figure 9:
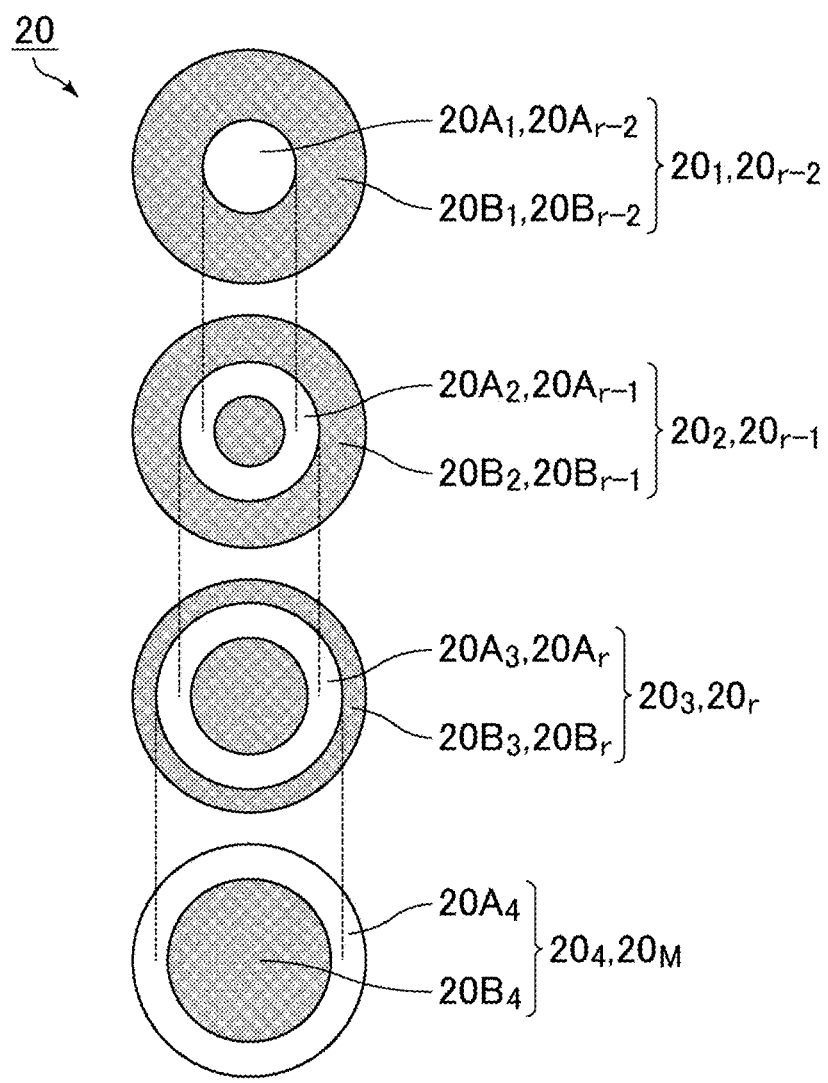
FIG. 9 is a schematic plan view of an example of a mask set for use in production of the optical element of Embodiment 1.

FIG. 9 is a schematic plan view of an example of a mask set for use in production of the optical element of Embodiment 1. The optical element 10 of the present embodiment can be produced using a mask set 20 shown in FIG. 4A, FIG. 4B, and FIG. 9. The mask set 20 includes a first mask $20_1$ having a first light-transmitting portion (aperture portion) $20A_1$ and a first light-blocking portion $20B_1$ and a second mask $20_2$ having a second light-transmitting portion $20A_2$ and a second light-blocking portion $20B_2$. In a state where the first mask $20_1$ and the second mask $20_2$ are overlaid with each other with the center of the first mask $20_1$ and the center of the second mask $20_2$ coinciding with each other, the first light-transmitting portion $20A_1$ overlaps part of the second light-transmitting portion $20A_2$ and part of the second light-blocking portion $20B_2$, and the second light-transmitting portion $20A_2$ overlaps part of the first light-transmitting portion $20A_1$ and part of the first light-blocking portion $20B_1$. This structure enables production of the optical element 10 using, in the production step, the first mask $20_1$ for the first exposure step and the second mask $20_2$ for the second exposure step.

Figure 10:
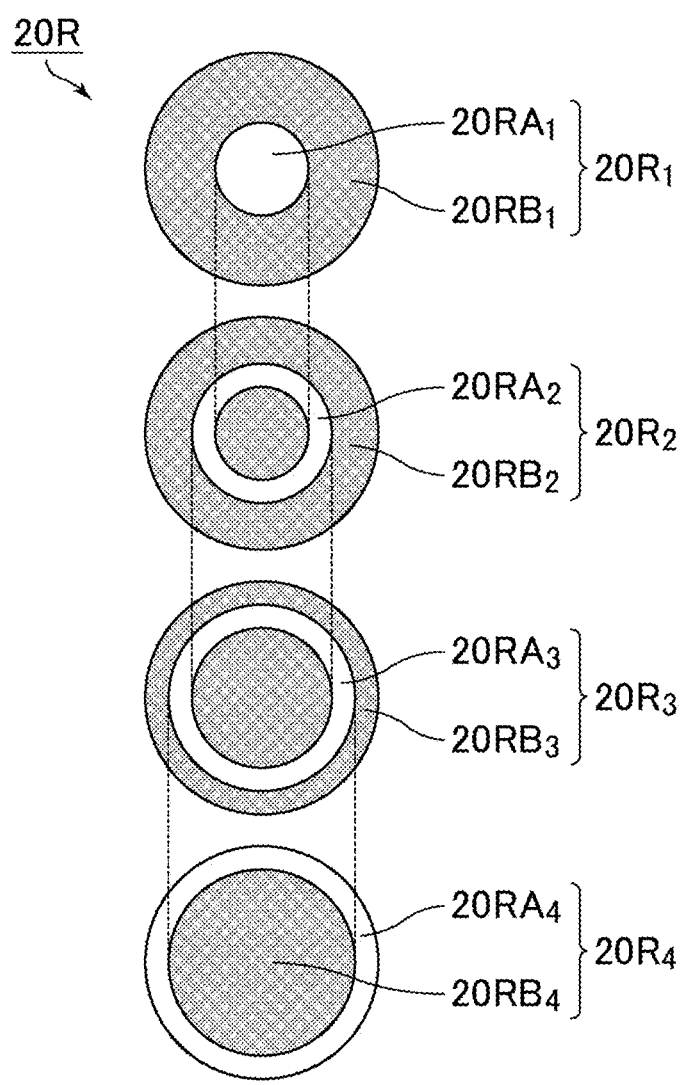
FIG. 10 is a schematic plan view of an example of a common mask set.

When the exposure is performed through multiple masks, usually, for example, a mask set 20R shown in FIG. 10 is used. FIG. 10 is a schematic plan view of an example of a common mask set. As shown in FIG. 10, the common mask set 20R includes a first mask $20R_1$ having a light-transmitting portion $20RA_1$ and a light-blocking portion $20RB_1$, a second mask $20R_2$ having a light-transmitting portion $20RA_2$ and a light-blocking portion $20RB_2$, a third mask $20R_3$ having a light-transmitting portion $20RA_3$ and a light-blocking portion $20RB_3$, and a fourth mask $20R_4$ having a light-transmitting portion $20RA_4$ and a light-blocking portion $20RB_4$. In a state where the first mask $20R_1$ to the fourth mask $20R_4$ are overlaid with one another with the center of the first mask $20R_1$ to the center of the fourth mask $20R_4$ coinciding with one another, the light-transmitting portions of the masks do not overlap one another.

As described above, the optical element 10 of the present embodiment can be produced by optical patterning of exposing the alignment film 200 containing a photo-alignment polymer to light in multiple predetermined patterns such that the alignment film 200 is patterned in the desired pattern through the multiple exposures. The first light-transmitting portion $20A_1$, the first light-blocking portion $20B_1$, the second light-transmitting portion $20A_2$, and the second light-blocking portion $20B_2$ each have a concentrical pattern with a predetermined width. The first mask $20_1$ and the second mask $20_2$ have patterns different from each other.

As shown in FIG. 9, the mask set 20 may include the first mask $20_1$ and the second mask $20_2$ to an M-th mask $20_M$. An r-th mask $20_r$ included in the first mask $20_1$ to the M-th mask $20_M$ includes an r-th light-transmitting portion $20A_r$ and an r-th light-blocking portion $20B_r$. An (r−1)th mask $20_{r-1}$ included in the first mask $20_1$ to the M-th mask $20_M$ includes an (r−1)th light-transmitting portion $20A_{r-1}$ and an (r−1)th light-blocking portion $20B_{r-1}$. An (r−2)th mask $20_{r-2}$ included in the first mask $20_1$ to the M-th mask $20_M$ includes an (r−2)th light-transmitting portion $20A_{r-2}$ and an (r−2)th light-blocking portion $20B_{r-2}$. In a state where the central portion of the r-th mask $20_r$ and the central portion of the (r−1)th mask $20_{r-1}$ coincide with each other, the (r−1)th light-transmitting portion $20A_{r-1}$ overlaps part of the r-th light-transmitting portion $20A_r$ and part of the r-th light-blocking portion $20B_r$, and the r-th light-transmitting portion $20A_r$ overlaps part of the (r−1)th light-transmitting portion $20A_{r-1}$ and part of the (r−1)th light-blocking portion $20B_{r-1}$ while not overlapping the (r−2)th light-transmitting portion $20A_{r-2}$. M is an integer of 3 or greater. r is an integer of 3 or greater and M or smaller. This structure can more easily increase the number of alignment patterns of the anisotropic molecules 310, thus enabling simpler production of the optical element 10 having a high diffraction efficiency.

Specifically, when M is 3, the mask set 20 further includes a third mask $20_3$ in addition to the first mask $20_1$ and the second mask $20_2$. The third mask $20_3$ includes a third light-transmitting portion $20A_3$ and a third light-blocking portion $20B_3$. In a state where the central portion of the third mask $20_3$ and the central portion of the second mask $20_2$ coincide with each other, the second light-transmitting portion $20A_2$ overlaps part of the third light-transmitting portion $20A_3$ and part of the third light-blocking portion $20B_3$ and the third light-transmitting portion $20A_3$ overlaps part of the second light-transmitting portion $20A_2$ and part of the second light-blocking portion $20B_2$ while not overlapping the first light-transmitting portion $20A_1$. This structure enables production of the optical element 10 using, in the production step, the third mask $20_3$ for the third exposure step.

Specifically, when M is 4, the mask set 20 further includes the third mask $20_3$ and a fourth mask $20_4$ in addition to the first mask $20_1$ and the second mask $20_2$. The fourth mask $20_4$ includes a fourth light-transmitting portion $20A_4$ and a fourth light-blocking portion $20B_4$. In a state where the central portion of the fourth mask $20_4$ and the central portion of the third mask $20_3$ coincides with each other, the third light-transmitting portion $20A_3$ overlaps part of the fourth light-transmitting portion $20A_4$ and part of the fourth light-blocking portion $20B_4$ and the fourth light-transmitting portion $20A_4$ overlaps part of the third light-transmitting portion $20A_3$ and part of the third light-blocking portion $20B_3$ while not overlapping the first light-transmitting portion $20A_1$ and the second light-transmitting portion $20A_2$. This structure enables production of the optical element 10 using, in the production step, the third mask $20_3$ for the third exposure step and the fourth mask $20_4$ for the fourth exposure step.

Each mask of the mask set 20 includes a concentrical light-transmitting portion and a concentrical light-blocking portion. The light-transmitting portion transmits light and has a transmittance of, for example, 80% or higher and 100% or lower. The light-blocking portion does not transmit light and has a transmittance of, for example, 0% or higher and 10% or lower.

Embodiment 2

Figure 11:
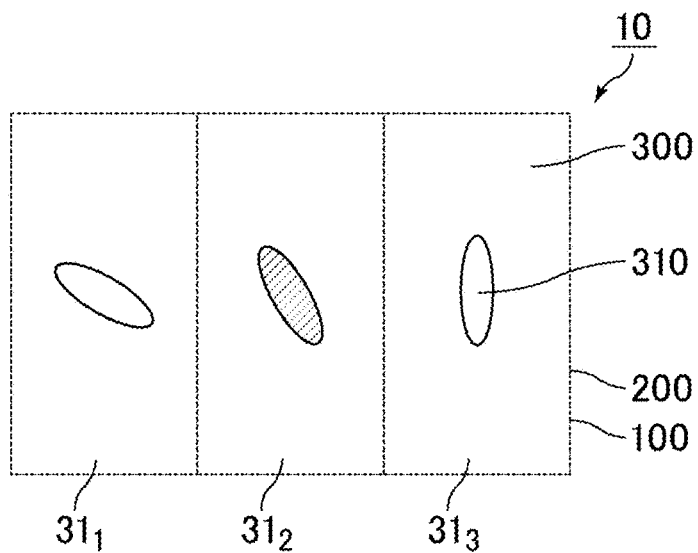
FIG. 11 is a schematic plan view of an optical element of Embodiment 2.

In the present embodiment, features unique to the present embodiment are mainly described, and description of matters already described in Embodiment 1 is omitted. FIG. 11 is a schematic plan view of an optical element of Embodiment 2. The optical element 10 of the present embodiment in FIG. 11 includes an optically anisotropic layer 300 containing anisotropic molecules 310. The optically anisotropic layer 300 includes a first region $31_1$ that has a depolarization property and a second region $31_2$ that has a higher depolarization property than the first region $31_1$. This structure can align the anisotropic molecules 310 in a continuous, periodic pattern in the plane as in Embodiment 1, achieving a high diffraction efficiency. Also, the optical element 10 having such a structure, for example, can be produced without an increase in the number of masks, and thus can be produced through a simple procedure.

Here, the depolarization property is a difference in contrast ratio between the region in question and the central portion of the optically anisotropic layer 300. In other words, the depolarization property of the first region $31_1$ is the difference in contrast ratio between the first region $31_1$ and the central portion of the optically anisotropic layer 300. The depolarization property of the second region $31_2$ is the difference in contrast ratio between the second region $31_2$ and the central portion of the optically anisotropic layer 300. The difference in contrast ratio is an absolute value.

The contrast ratio is a value obtained by dividing the highest luminance by the lowest luminance determined in a state where the optically anisotropic layer 300 is disposed between a pair of polarizing plates arranged in crossed Nicols. For example, the contrast ratio of the first region $31_1$ is a value obtained by dividing the highest luminance of the first region $31_1$ by the lowest luminance thereof in a state where the optically anisotropic layer 300 is disposed between a pair of polarizing plates arranged in crossed Nicols. The contrast ratio of the second region $31_2$ is a value obtained by dividing the highest luminance of the second region $31_2$ by the lowest luminance thereof in a state where the optically anisotropic layer 300 is disposed between a pair of polarizing plates arranged in crossed Nicols. The contrast ratio of the central portion of the optically anisotropic layer 300 is a value obtained by dividing the highest luminance of the central portion of the optically anisotropic layer 300 by the lowest luminance thereof in a state where the optically anisotropic layer 300 is disposed between a pair of polarizing plates arranged in crossed Nicols.

The first region $31_1$ and the second region $31_2$ are arranged in an annular pattern. Specifically, the first region $31_1$ and the second region $31_2$ in a plan view are arranged in an annular pattern. The optical element 10 of the present embodiment is a Pancharatnam-Berry phase optical element.

The first region $31_1$ has, for example, a depolarization property of 0 or higher and lower than 1. The second region $31_2$ has, for example, a depolarization property of 1 or higher and 10 or lower.

As shown in FIG. 11, preferably, the optically anisotropic layer 300 further includes a third region $31_3$ having a lower depolarization property than the second region $31_2$ in addition to the first region $31_1$ and the second region $31_2$, and the first region $31_1$, the second region $31_2$, and the third region $31_3$ are arranged in the stated order from the central portion toward the end portion of the optically anisotropic layer 300 in a plan view. This structure can align the anisotropic molecules 310 in a more continuous, periodic pattern in the plane, thus achieving a higher diffraction efficiency.

Figure 12:
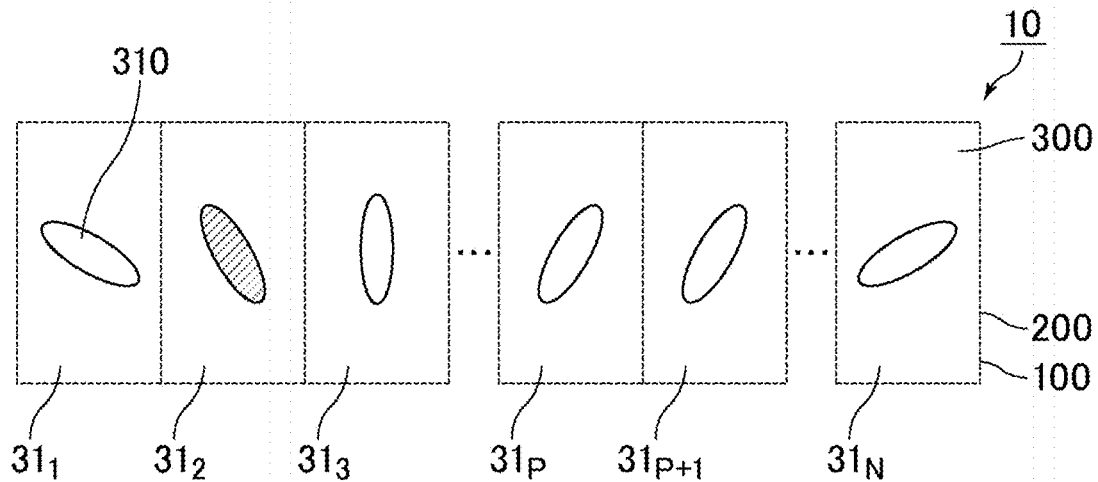
FIG. 12 is a schematic plan view of an example of the optical element of Embodiment 2.

FIG. 12 is a schematic plan view of an example of the optical element of Embodiment 1. As shown in FIG. 12, the optically anisotropic layer 300 includes the third region $31_3$ to the N-th region $31_N$ in addition to the first region $31_1$ and the second region $31_2$. The first region $31_1$ to the N-th region $31_N$ are arranged in the stated order from the central portion toward the end portion of the optically anisotropic layer 300 in a plan view. Preferably, a p-th region $31_p$ included in the first region $31_1$ to the N-th region $31_N$ is a region that has a first depolarization property and a (p+1)th region $31_{p+1}$ included in the first region $31_1$ to the N-th region $31_N$ is a region that has a second depolarization property higher than the first depolarization property. N is an integer of 4 or greater. p is an odd number of 1 or greater and (N−1) or smaller. This structure can align the anisotropic molecules 310 in a more continuous, periodic pattern in the plane, thus achieving a higher diffraction efficiency.

The first depolarization property is, for example, 0 or higher and lower than 1. The second depolarization property is, for example, 1 or higher and 10 or lower.

The optical element 10 of Embodiment 2 can be produced by the same method as in Embodiment 1. The conditions of the polarized UV light to be applied to the photoalignment film vary according to whether multi-exposure is performed or not, which leads to different alignment regulating forces across the alignment film. The different alignment regulating forces make the depolarization property different between a multi-exposed region and a non-multi-exposed region. As a result, the optical element 10 of the present embodiment includes the first region $31_1$ and the second region $31_2$ different in depolarization property from each other.

Figure 13:
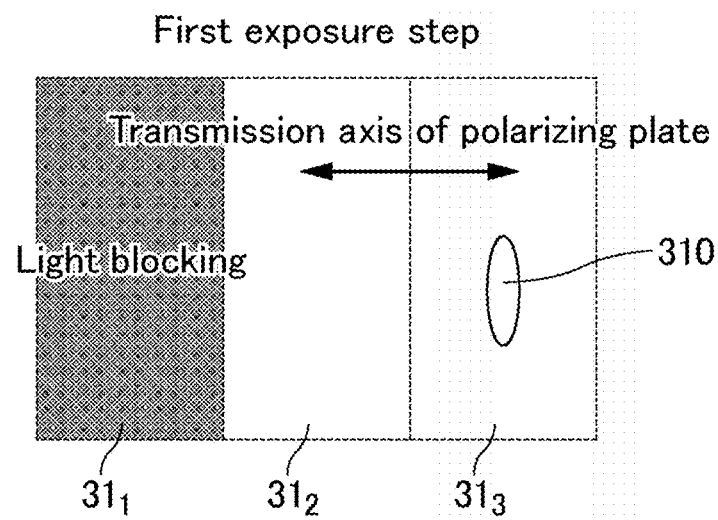
FIG. 13 is a schematic view of a first exposure step in a method of producing the optical element of Embodiment 2.
Figure 14:
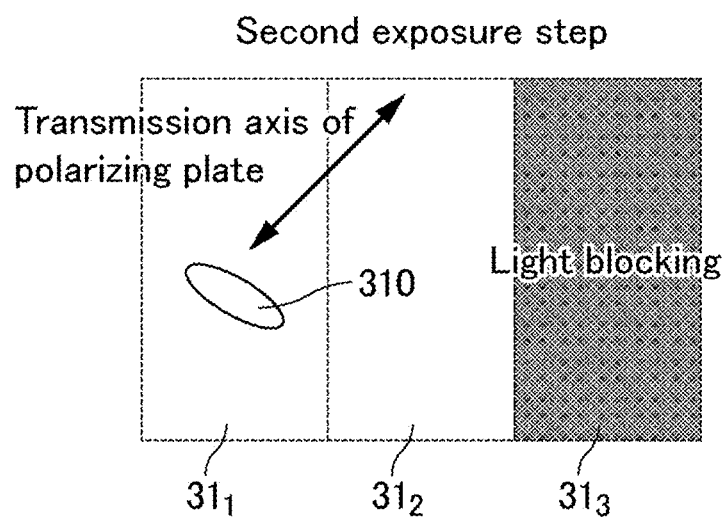
FIG. 14 is a schematic view of a second exposure step in the method of producing the optical element of Embodiment 2.
Figure 15:
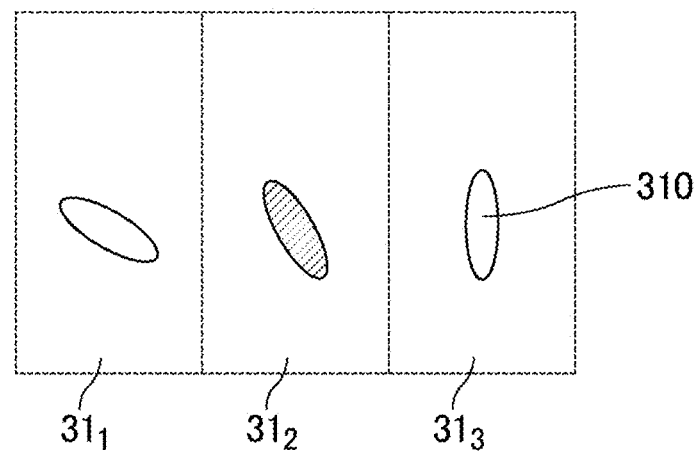
FIG. 15 is a schematic view of a state after the first exposure step and the second exposure step in the method of producing the optical element of Embodiment 2.

As shown in FIG. 13 to FIG. 15, the molecular alignment in the multi-exposed region is the average of the two exposures. Thus, the alignment direction of the alignment film 200 can be varied among the portion of the first exposure region not overlapping the second exposure region, the portion of the second exposure region not overlapping the first exposure region, and the portion of the first exposure region overlapping the second exposure region. In other words, exposure of the alignment film 200 to light twice imparts 3 types of alignment directions to the alignment film 200. As a result, the number of alignment patterns of the anisotropic molecules 310 can be increased with a fewer number of exposures, which enables simpler production of the optical element 10 having a high diffraction efficiency. For example, the optical element 10 having a high diffraction efficiency can be produced without an increase in the number of masks. FIG. 13 is a schematic view of the first exposure step in the method of producing the optical element of Embodiment 2. FIG. 14 is a schematic view of the second exposure step in the method of producing the optical element of Embodiment 2. FIG. 15 is a schematic view of a state after the first exposure step and the second exposure step in the method of producing the optical element of Embodiment 2.

For example, the portion of the first exposure region not overlapping the second exposure region corresponds to the first region $31_1$, the portion of the second exposure region not overlapping the first exposure region corresponds to the third region $31_3$, and the portion of the first exposure region overlapping the second exposure region corresponds to the second region $31_2$.

EXAMPLES

The present invention is described in more detail below with reference to examples and comparative examples. The present invention is not limited to the examples.

Example 1

Figure 16:
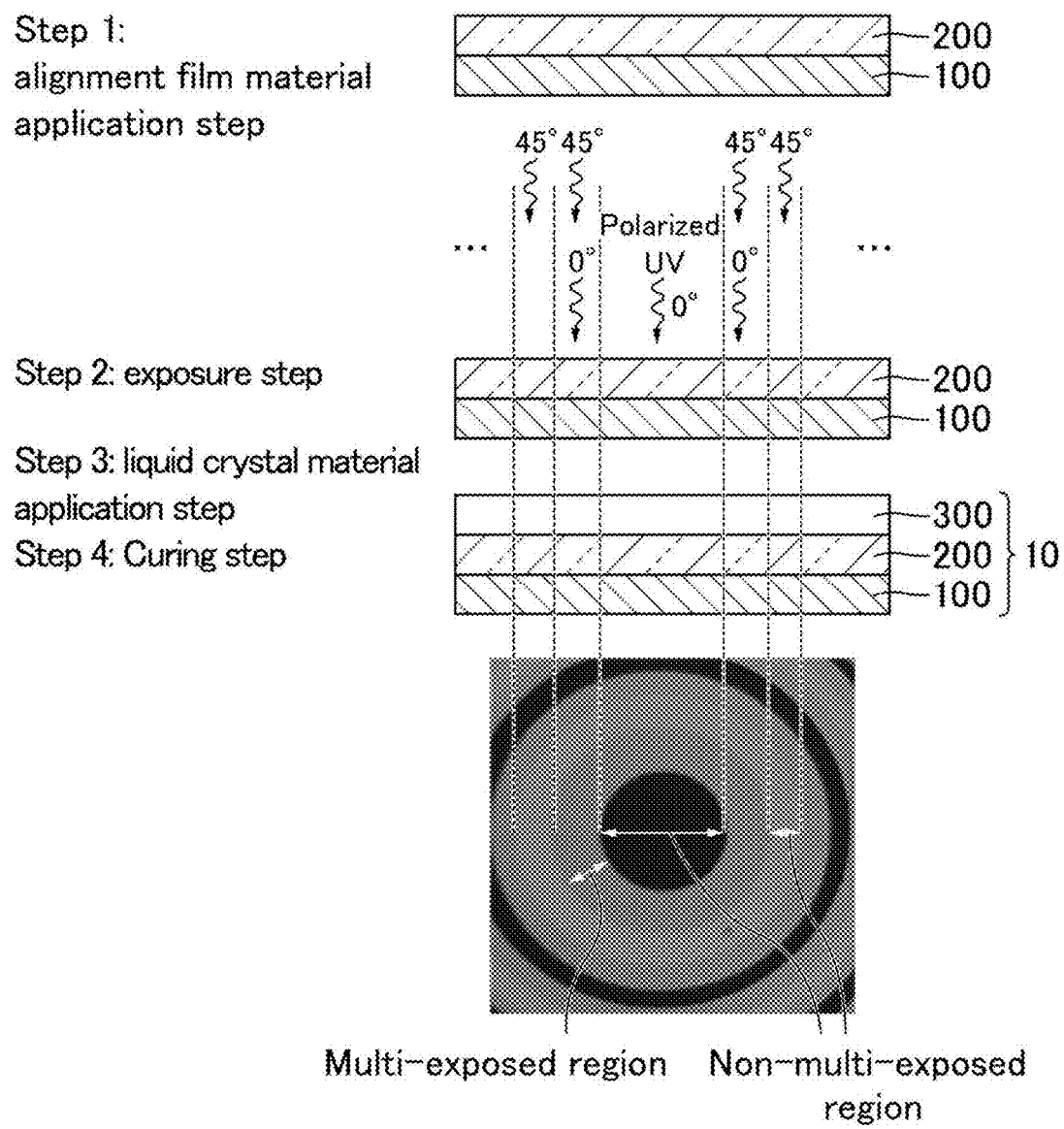
FIG. 16 is a schematic cross-sectional view of a method of producing an optical element of Example 1 and a polarizing micrograph of the optical element of Example 1.
Figure 17:
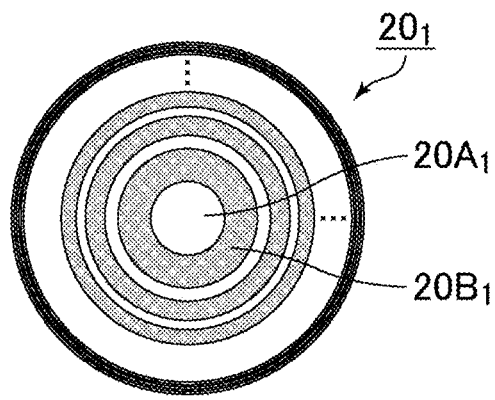
FIG. 17 is a schematic view of a first mask used in irradiation with polarized UV light having its polarization axis at 0° in production of the optical element of Example 1.
Figure 18:
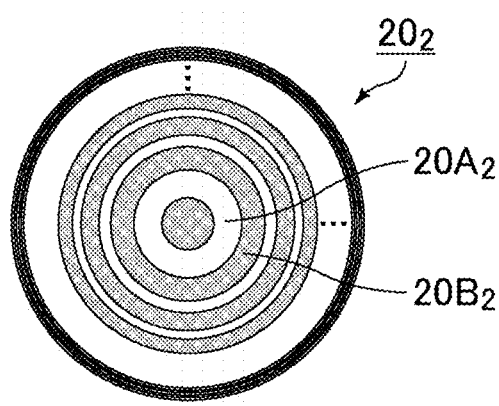
FIG. 18 is a schematic view of a second mask used in irradiation with polarized UV light having its polarization axis at 45° in the production of the optical element of Example 1.
Figure 19:
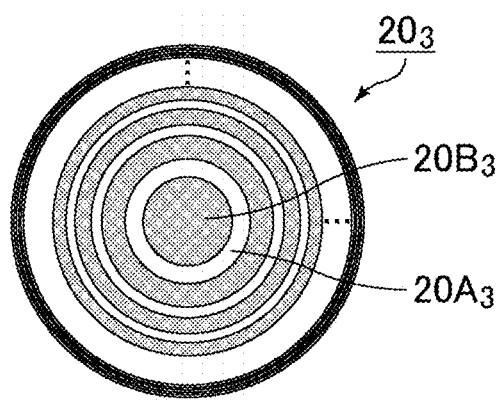
FIG. 19 is a schematic view of a third mask used in irradiation with polarized UV light having its polarization axis at 90° in the production of the optical element of Example 1.
Figure 20:
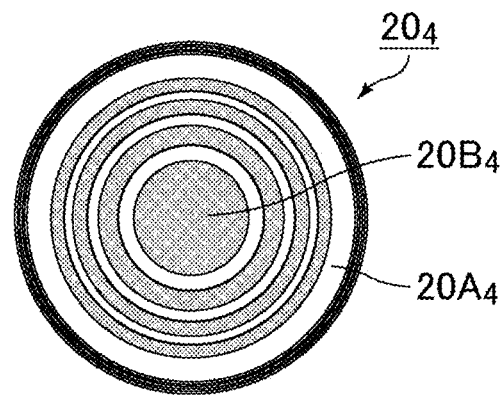
FIG. 20 is a schematic view of a fourth mask used in irradiation with polarized UV light having its polarization axis at 135° in the production of the optical element of Example 1.

FIG. 16 is a schematic cross-sectional view of a method of producing an optical element of Example 1 and a polarizing micrograph of the optical element of Example 1. FIG. 17 is a schematic view of a first mask used in irradiation with polarized UV light having its polarization axis at 0° in production of the optical element of Example 1. FIG. 18 is a schematic view of a second mask used in irradiation with polarized UV light having its polarization axis at 45° in the production of the optical element of Example 1. FIG. 19 is a schematic view of a third mask used in irradiation with polarized UV light having its polarization axis at 90° in the production of the optical element of Example 1. FIG. 20 is a schematic view of a fourth mask used in irradiation with polarized UV light having its polarization axis at 135° in the production of the optical element of Example 1.

The method shown in FIG. 16 was performed to produce the optical element of Example 1 corresponding to the optical element 10 of Embodiment 1. First, in the alignment film formation step, an alignment film material containing a photo-alignment polymer with a photoisomerizable photo-functional group was applied to a glass substrate serving as a supporting substrate 100 to form an alignment film 200.

Then, in exposure step, a mask set 20 was used to expose the alignment film 200 to light. The mask set 20 consisted of 4 annular masks (first mask $20_1$, second mask $20_2$, third mask $20_3$ and fourth mask $20_4$) in each of which a light-transmitting portion alternates with a light-blocking portion. The 4 masks are designed such that, in a state where the masks were overlaid with one another with the centers thereof coinciding with one another, a region in which the light-transmitting portions overlap alternated with a region in which the light-transmitting portions do not overlap.

In the first exposure step, the first mask $20_1$ shown in FIG. 17 was used to irradiate the alignment film 200 with polarized UV light having its polarization axis at 0°. In the second exposure step, the second mask $20_2$ shown in FIG. 18 was used to irradiate the alignment film 200 with polarized UV light having its polarization axis at 45°. In the third exposure step, the third mask $20_3$ shown in FIG. 19 was used to irradiate the alignment film 200 with polarized UV light having its polarization axis at 90°. In the fourth exposure step, the fourth mask $20_4$ shown in FIG. 20 was used to irradiate the alignment film 200 with polarized UV light having its polarization axis at 135°. The first mask $20_1$, the second mask $20_2$, the third mask $20_3$, and the fourth mask $20_4$ were arranged specifically as shown in FIG. 4A and FIG. 4B. In each of the first exposure step to the fourth exposure step, polarized UV light was applied with a dose of 100 mJ/cm$^2$ (365 nm).

After the fourth exposure step, the alignment film 200 was baked for 20 minutes in an oven set at 160° C. Next, in the liquid crystal layer formation step, a polymerizable liquid crystal material (anisotropic molecules 310) was applied to the alignment film 200. The polymerizable liquid crystal material was applied with a spin coater having a rotational speed of 1000 rpm. The film thickness (of the resulting layer) was set such that the resulting layer would introduce a phase difference of $\lambda/2$ to light having a wavelength of 532 nm.

Then, in the curing step, the applied polymerizable liquid crystal material was exposed to non-polarized UV light with a dose of 200 mJ (365 nm) to cure the polymerizable liquid crystal material, so that the optical element 10 of Example 1 was obtained. As shown in FIG. 16, the polarizing microscope observation confirmed that cured polymerizable liquid crystal material (anisotropic molecules 310) was in a normal alignment.

<Measurement of Molecular Alignment (Angle of Alignment) in Non-Multi-Exposed Regions A and B>

Figure 21:
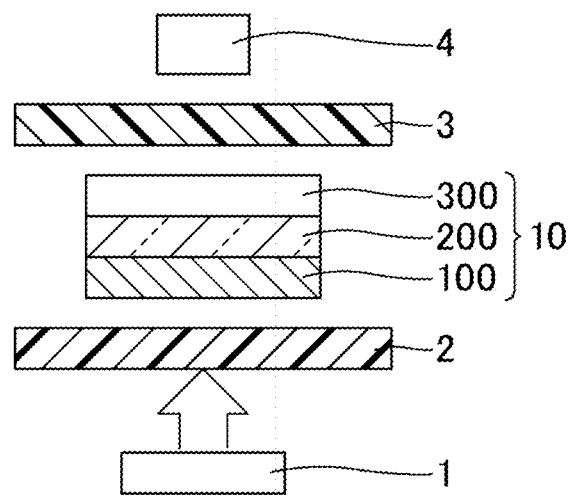
FIG. 21 is a schematic cross-sectional view of a method of measuring the front side molecular alignment in an optically anisotropic layer.
Figure 22:
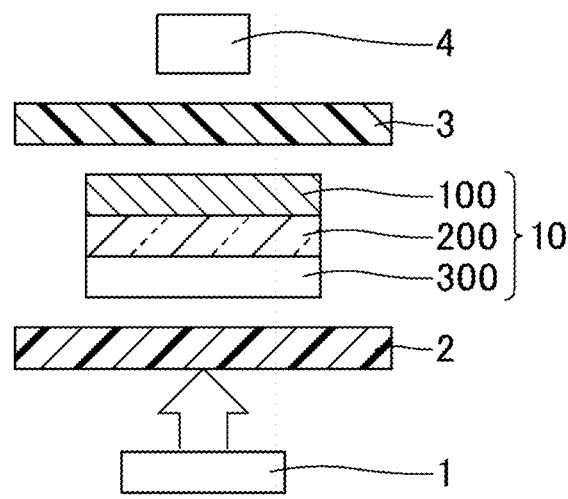
FIG. 22 is a schematic cross-sectional view of a method of measuring the back side molecular alignment in the optically anisotropic layer.
Figure 23:
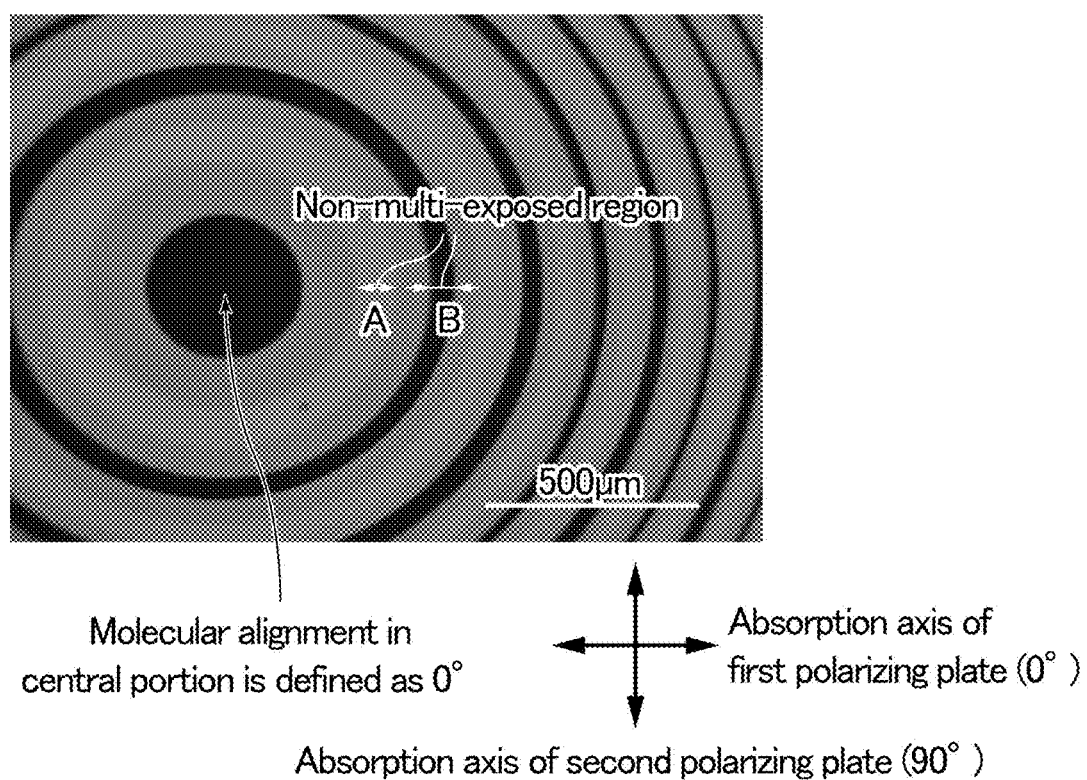
FIG. 23 is a polarizing micrograph of the optical element of Example 1 when the central portion of the optical element of Example 1 is darkest.
Figure 24:
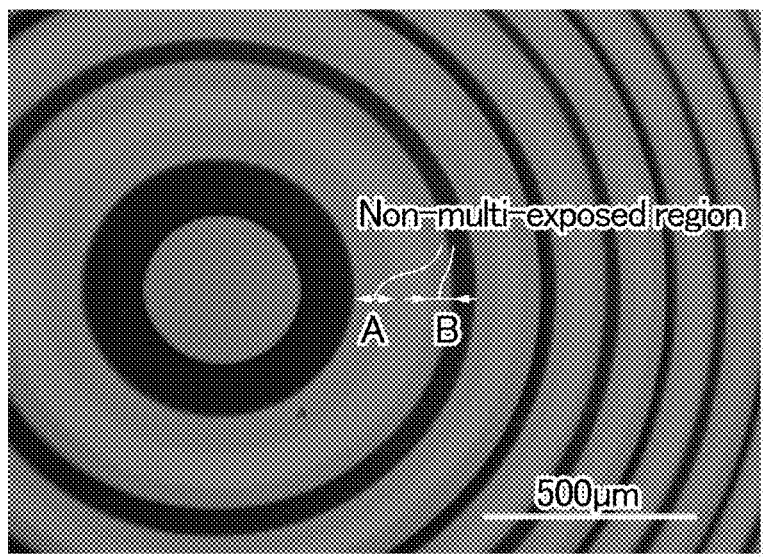
FIG. 24 is a polarizing micrograph of the optical element of Example 1 when the first polarizing plate and the second polarizing plate are rotated 20° from the state in FIG. 23 while the first polarizing plate and the second polarizing plate are maintained in the crossed Nicols arrangement.
Figure 24:
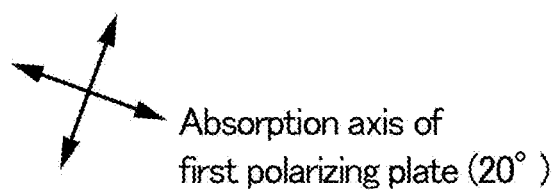
Figure 25:
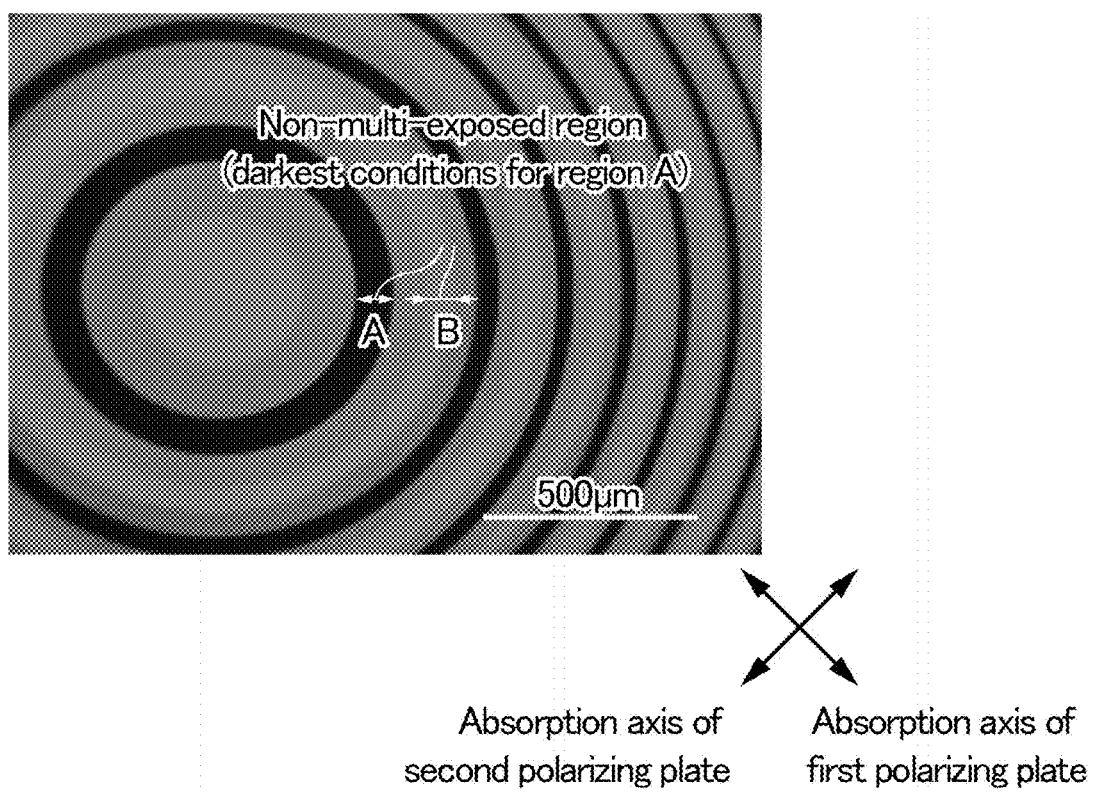
FIG. 25 is a polarizing micrograph of the optical element of Example 1 when the first polarizing plate and the second polarizing plate are rotated such that the region A, not subjected to multi-exposure, becomes darkest while the first polarizing plate and the second polarizing plate are maintained in the crossed Nicols arrangement.

FIG. 21 is a schematic cross-sectional view of a method of measuring the front side molecular alignment in the optically anisotropic layer. FIG. 22 is a schematic cross-sectional view of a method of measuring the back side molecular alignment in the optically anisotropic layer. FIG. 23 is a polarizing micrograph of the optical element of Example 1 when the central portion of the optical element of Example 1 is darkest. FIG. 24 is a polarizing micrograph of the optical element of Example 1 when the first polarizing plate and the second polarizing plate are rotated 20° from the state in FIG. 23 while the first polarizing plate and the second polarizing plate are maintained in the crossed Nicols arrangement. FIG. 25 is a polarizing micrograph of the optical element of Example 1 when the first polarizing plate and the second polarizing plate are rotated such that the region A, not subjected to multi-exposure, becomes darkest while the first polarizing plate and the second polarizing plate are maintained in the crossed Nicols arrangement. FIG. 23 to FIG. 25 show non-multi-exposed regions A and B.

As shown in FIG. 21 and FIG. 22, in a polarizing microscope including a light source 1, a first polarizing plate 2, a second polarizing plate 3, and a camera 4, the optical element 10 of Example 1 was disposed between the first polarizing plate 2 and the second polarizing plate 3 to evaluate the molecular alignment (angle of alignment) of the optical element 10. The angle formed between the absorption axis of the first polarizing plate 2 and the absorption axis of the second polarizing plate 3 was set at 90°. In other words, the first polarizing plate 2 and the second polarizing plate 3 were arranged in crossed Nicols.

The angle of alignment was measured specifically as described below. First, the molecular alignment in the central portion of the optically anisotropic layer 300 was defined as 0°. Also, while the first polarizing plate 2 and the second polarizing plate 3 in the polarizing microscope were maintained in crossed Nicols arrangement, the polarization axes (absorption axes) of the first polarizing plate 2 and the second polarizing plate 3 were rotated. In this state, as shown in FIG. 23, the angle of the absorption axis of the first polarizing plate 2 when the luminance in the central portion (non-multi-exposed region) of the optically anisotropic layer 300 was lowest was set at 0°.

Then, as shown in FIG. 24 and FIG. 25, while the first polarizing plate 2 and the second polarizing plate 3 in the polarizing microscope were maintained in crossed Nicols arrangement, the polarization axes (absorption axes) of the first polarizing plate 2 and the second polarizing plate 3 were rotated. In this state, as shown in FIG. 25, the angle of the absorption axis of the first polarizing plate 2 when the luminance of the region A was lowest was taken as the angle of alignment in the region A. The region B was measured in the same manner.

For each of the non-multi-exposed regions A and B shown in FIG. 23 to FIG. 25, the front side molecular alignment and the back side molecular alignment in the optically anisotropic layer 300 were measured. The front side molecular alignment was measured in a state where, as shown in FIG. 21, the optical element 10 was disposed such that the optically anisotropic layer 300, the alignment film 200, and the supporting substrate 100 were arranged sequentially from the camera 4 side toward the light source 1 side. The back side molecular alignment was measured in a state where, as shown in FIG. 22, the optical element 10 was disposed such that the supporting substrate 100, the alignment film 200, and the optically anisotropic layer 300 were arranged sequentially from the camera 4 side toward the light source 1 side. In other words, the angle of alignment of molecules as observed from the optically anisotropic layer 300 side was set as the front side angle of alignment, and the angle of alignment of molecules as observed from the supporting substrate 110 side was set as the back side angle of alignment.

<Measurement of Molecular Alignment (Angle of Alignment) in Multi-Exposed Regions C, D, and E>

Figure 26:
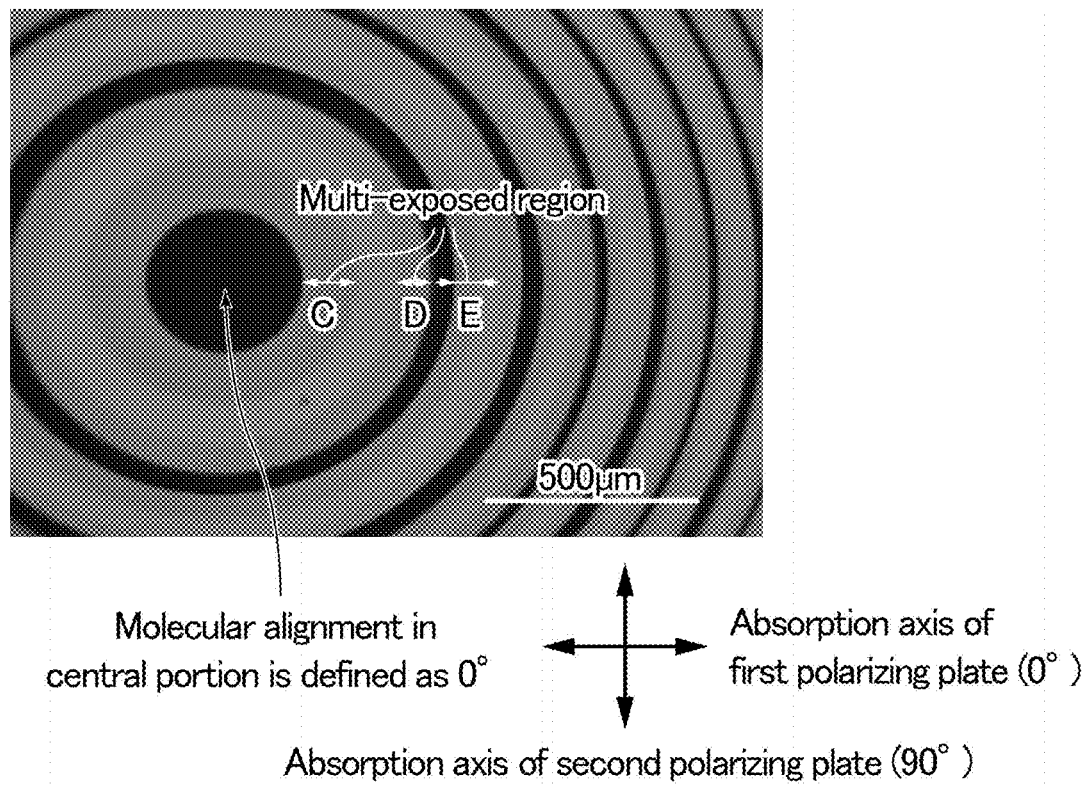
FIG. 26 is a micrograph showing multi-exposed regions in the optical element of Example 1.

FIG. 26 is a micrograph of multi-exposed regions in the optical element of Example 1. For each of the multi-exposed regions C, D, and E shown in FIG. 26, as with the non-multi-exposed regions A and B, the front side molecular alignment and the back side molecular alignment were measured.

<Molecular Alignment (Angle of Alignment) Measurement Results>

Figure 27:
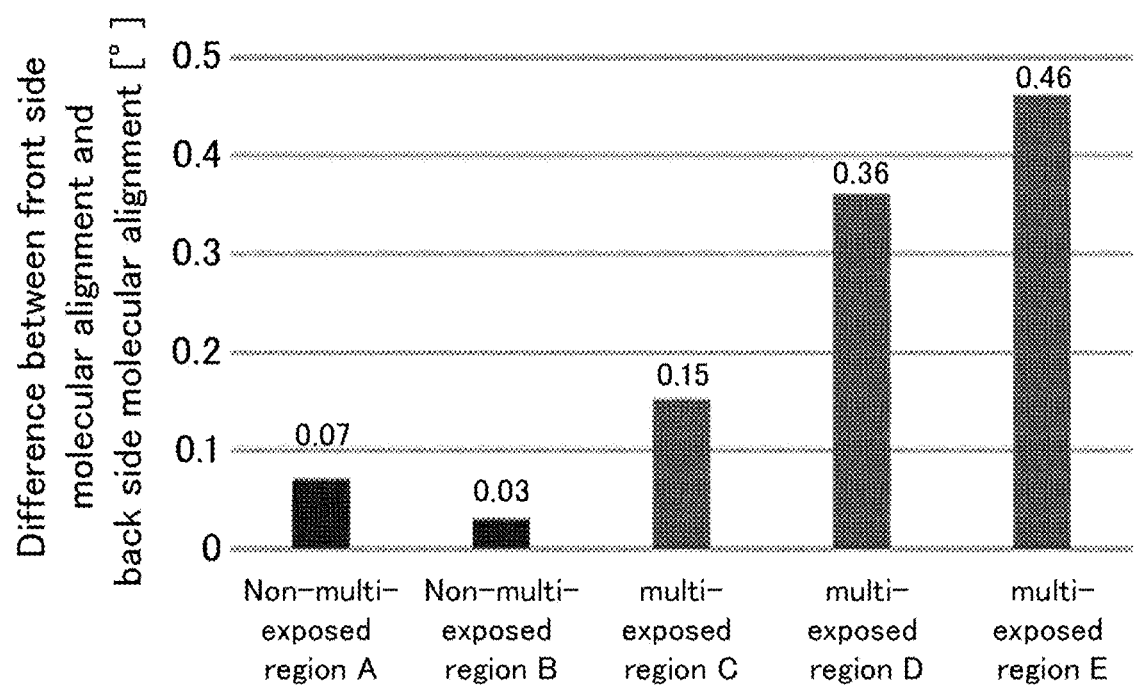
FIG. 27 is a graph showing differences between the front side molecular alignment and the back side molecular alignment in non-multi-exposed regions A and B and multi-exposed regions C, D, and E in the optical element of Example 1.

The following Table 1 and FIG. 27 show the front side molecular alignment, the back side molecular alignment, and the difference between the front side molecular alignment and the back side molecular alignment in each of the non-multi-exposed regions A and B and the multi-exposed regions C, D, and E. FIG. 27 is a graph showing differences between the front side molecular alignment and the back side molecular alignment in non-multi-exposed regions A and B and multi-exposed regions C, D, and E in the optical element of Example 1.

TABLE 1

|  | Non-multi-exposed region | | Multi-exposed region | | |
| --- | --- | --- | --- | --- | --- |
|  | Region A | Region B | Region C | Region D | Region E |
| Front side molecular alignment (angle of alignment) | 44.93° | 90.02° | 25.01° | 70.12° | 110.21° |
| Back side molecular alignment (angle of alignment) | 44.86° | 89.99° | 25.16° | 69.76° | 109.75° |
| Difference between front side molecular alignment and back side molecular alignment | 0.07° | 0.03° | 0.15° | 0.36° | 0.46° |

Figure 28:
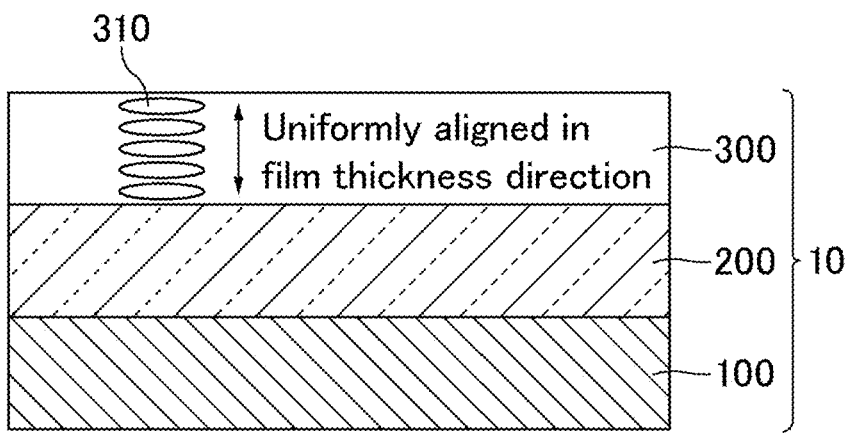
FIG. 28 is a schematic cross-sectional view showing a non-multi-exposed region in the optical element of Example 1.

As shown in Table 1 and FIG. 27, in each of the non-multi-exposed regions A and B, the difference between the front side molecular alignment and the back side molecular alignment was as small as less than 0.10°. In other words, in the non-multi-exposed regions, as shown in FIG. 28, molecules of the polymerizable liquid crystal material (anisotropic molecules 310) were uniformly aligned in the film thickness direction of the optically anisotropic layer 300. FIG. 28 is a schematic cross-sectional view of a non-multi-exposed region in the optical element of Example 1. When the difference between the front side molecular alignment and the back side molecular alignment is 0.10° or more, molecules of the polymerizable liquid crystal material (anisotropic molecules 310) can be determined as being partly twist-aligned without being uniformly aligned in the film thickness direction of the optically anisotropic layer 300.

As shown in Table 1 and FIG. 27, in the multi-exposed regions C, D, and E, unlike the non-multi-exposed regions A and B, the difference between the front side molecular alignment and the back side molecular alignment was found to be 0.1° or more. This phenomenon is presumably due to the non-uniform alignment of the anisotropic molecules 310 in the film thickness direction of the optically anisotropic layer 300. In other words, in the multi-exposed regions C, D, and E, the anisotropic molecules 310 are presumably partly twist-aligned in the film thickness direction of the optically anisotropic layer 300.

FIG. 23 to FIG. 27 show that the optically anisotropic layer 300 in the optical element 10 of Example 1 alternately included regions (non-multi-exposed regions A and B) where the anisotropic molecules 310 were not twist-aligned in the film thickness direction of the optically anisotropic layer 300 and regions (multi-exposed regions C, D, and E) where the anisotropic molecules 310 were twist-aligned in the film thickness direction of the optically anisotropic layer 300.

<Evaluation of Depolarization Properties of Non-Multi-Exposed Regions A and B>

Figure 29:
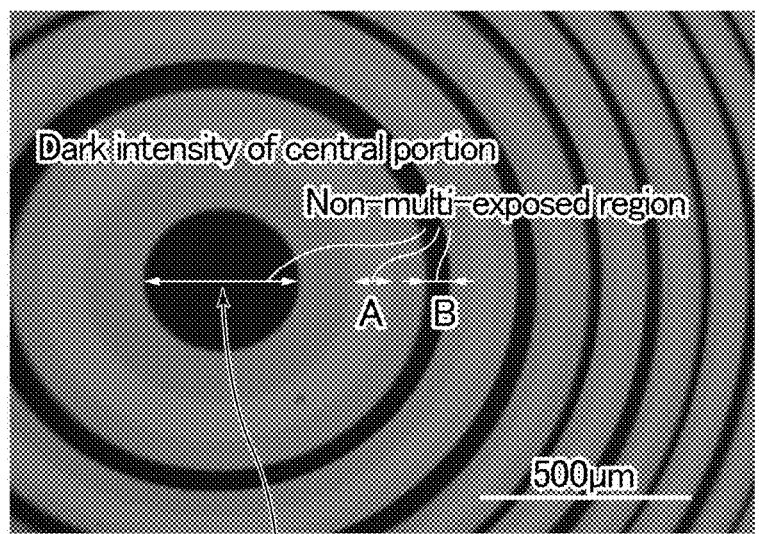
FIG. 29 is a polarizing micrograph showing a method of measuring the "dark intensity" of the central portion of the optical element of Example 1.
Figure 29:
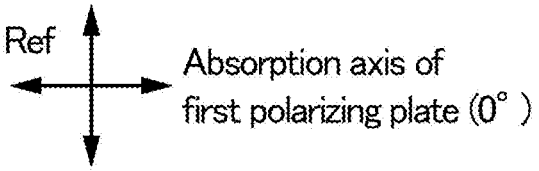
Figure 30:
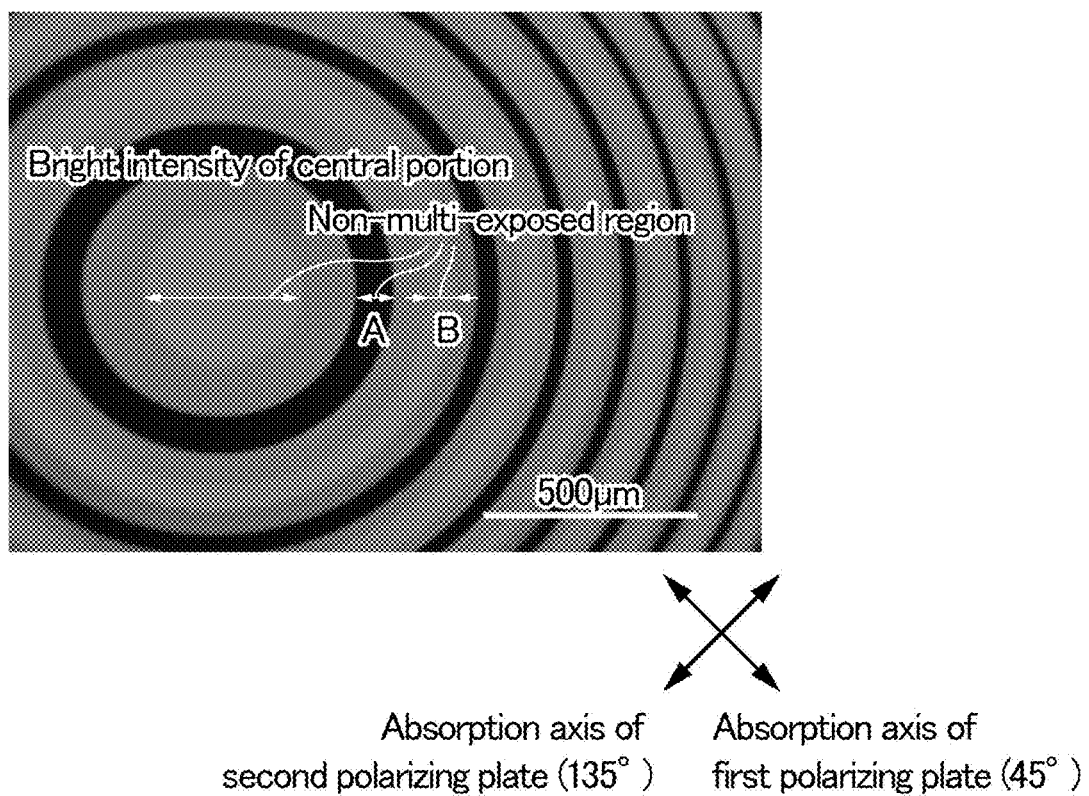
FIG. 30 is a polarizing micrograph showing a method of measuring the "bright intensity" of the central portion of the optical element of Example 1.

FIG. 29 is a polarizing micrograph showing a method of measuring the "dark intensity" of the central portion of the optical element of Example 1. FIG. 30 is a polarizing micrograph showing a method of measuring the "bright intensity" of the central portion of the optical element of Example 1. FIG. 30 is a polarizing micrograph of the optical element 10 of Example 1 when the first polarizing plate and the second polarizing plate in the state in FIG. 29 were rotated 45° while the first polarizing plate and the second polarizing plate were maintained in crossed Nicols arrangement.

The depolarization property of each of the non-multi-exposed regions A and B was measured. Specifically, the contrast ratios of the central portion (non-multi-exposed region) and the non-multi-exposed regions A and B in the optically anisotropic layer 300 were measured. Based on the difference in contrast ratio between the non-multi-exposed region A and the central portion of the optically anisotropic layer 300, the depolarization property of the region A was evaluated. Similarly, based on the difference in contrast ratio between the non-multi-exposed region B and the central portion of the optically anisotropic layer 300, the depolarization property of the region B was evaluated.

The contrast ratio of the central portion of the optically anisotropic layer 300 was measured as follows. The optical element 10 was placed in a polarizing microscope with the arrangement shown in FIG. 21, i.e., the arrangement that allows measurement of the front side molecular alignment in the optically anisotropic layer 300. While the central portion of the optical element 10 of Example 1 was observed with the polarizing microscope, the absorption axes of the first polarizing plate 2 and the second polarizing plate 3 were rotated in a state where the first polarizing plate 2 and the second polarizing plate 3 were maintained in crossed Nicols arrangement. Then, the light intensity when the central portion was darkest as shown in FIG. 29 was measured as "dark intensity", and the light intensity when the central portion was brightest as shown in FIG. 30 was measured as "bright intensity". In addition, the contrast ratio of the central portion was determined by dividing the "bright intensity" of the central portion by the "dark intensity" of the central portion.

When the absorption axis of the polarizing plate and the slow axis of the optically anisotropic layer 300 were perpendicular or parallel to each other, light passing through the first polarizing plate 2 and the second polarizing plate 3 arranged in crossed Nicols appeared darkest as shown in FIG. 29. When the absorption axis of the polarizing plate and the slow axis of the optically anisotropic layer 300 formed an angle of 45°, light passing through the first polarizing plate 2 and the second polarizing plate 3 arranged in crossed Nicols was brightest as shown in FIG. 30. The absorption axis of the first polarizing plate 2 in FIG. 29 was at 0°. The absorption axis of the first polarizing plate 2 in FIG. 30 was at 45°.

As with the central portion, the "dark intensity" and the "bright intensity" of each of the non-multi-exposed regions A and B were measured to determine the contrast ratio.

With the contrast ratio of the central portion (non-multi-exposed region) taken as the reference, the difference in contrast ratio between the non-multi-exposed region A and the central portion and the difference in contrast ratio between the non-multi-exposed region B and the central portion were determined. Thereby, the depolarization properties of the non-multi-exposed regions were evaluated.

<Evaluation of Depolarization Properties of Multi-Exposed Regions C, D, and E>

Figure 31:
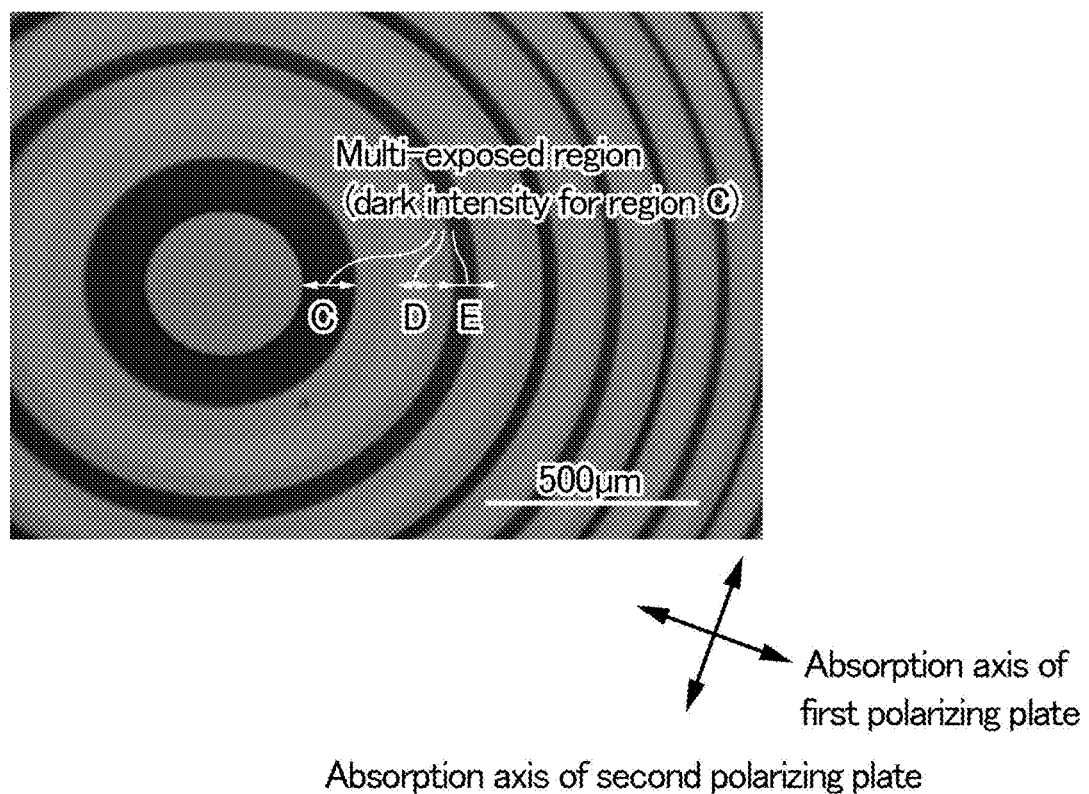
FIG. 31 is a polarizing micrograph showing a method of measuring the "dark intensity" of the multi-exposed region C in the optical element of Example 1.
Figure 32:
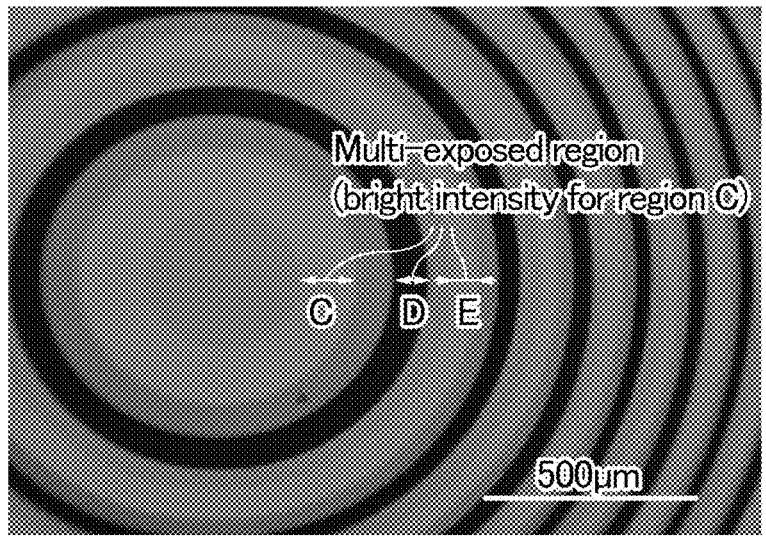
FIG. 32 is a polarizing micrograph showing a method of measuring the "bright intensity" of the multi-exposed region C in the optical element of Example 1.
Figure 32:
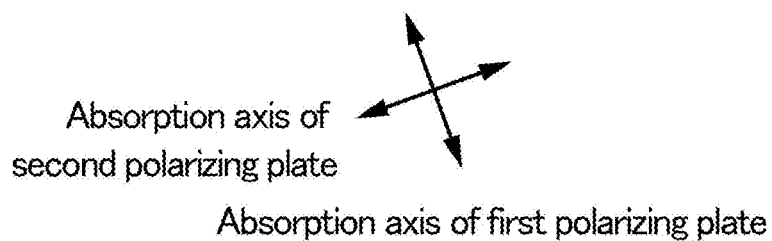

FIG. 31 is a polarizing micrograph showing a method of measuring the "dark intensity" of the multi-exposed region C in the optical element of Example 1. FIG. 32 is a polarizing micrograph showing a method of measuring the "bright intensity" of the multi-exposed region C in the optical element of Example 1. FIG. 32 is a polarizing micrograph of the optical element 10 of Example 1 when the first polarizing plate and the second polarizing plate in FIG. 21 were rotated 45° in the state where the first polarizing plate and the second polarizing plate were maintained in the crossed Nicols arrangement.

As with the non-multi-exposed regions A and B, the depolarization property of each of the multi-exposed regions C, D, and E was evaluated. Specifically, while the central portion of the optical element 10 of Example 1 was observed with the polarizing microscope, the absorption axes of the first polarizing plate 2 and the second polarizing plate 3 were rotated in a state where the first polarizing plate 2 and the second polarizing plate 3 were maintained in crossed Nicols arrangement. Then, the light intensity when the central portion was darkest as shown in FIG. 31 was measured as "dark intensity", and the light intensity when the central portion was brightest as shown in FIG. 32 was measured as "brightest intensity".

In addition, the contrast ratio of the multi-exposed region C was determined by dividing the "bright intensity" of the multi-exposed region C by the "dark intensity" of the multi-exposed region C. The contrast ratios of the multi-exposed regions D and E were determined in the same manner.

With the contrast ratio of the central portion (non-multi-exposed region) taken as the reference, the difference in contrast ratio between the multi-exposed region C and the central portion, the difference in contrast ratio between the multi-exposed region D and the central portion, and the difference in contrast ratio between the non-multi-exposed region E and the central portion were determined. Thereby, the depolarization properties of the multi-exposed regions were evaluated.

<Evaluation Results of Depolarization Property>

Figure 33:
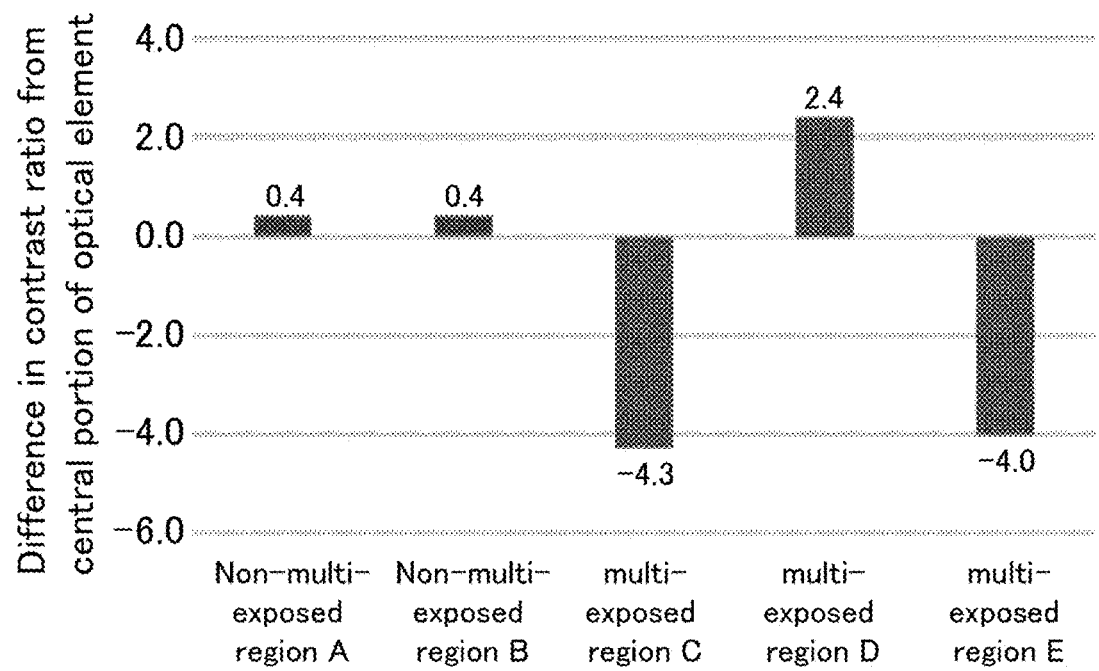
FIG. 33 is a graph showing the depolarization properties of the non-multi-exposed regions A and B and the multi-exposed regions C, D, and E in the optical element of Example 1.

The following Table 2 and FIG. 33 show the depolarization properties of the non-multi-exposed regions A and B and the multi-exposed regions C, D, and E. FIG. 33 is a graph showing the depolarization properties of the non-multi-exposed regions A and B and the multi-exposed regions C, D, and E in the optical element of Example 1.

TABLE 2

|  | Central portion of optical element (reference) | Non-multi-exposed region | | Multi-exposed region | | |
| --- | --- | --- | --- | --- | --- | --- |
|  |  | Region A | Region B | Region C | Region D | Region E |
| Contrast ratio | 10.6 | 11.0 | 11.0 | 6.3 | 13.0 | 6.6 |
| Difference in contrast ratio from central portion of optical element | — | 0.4 | 0.4 | −4.3 | 2.4 | −4.0 |

Figure 34:
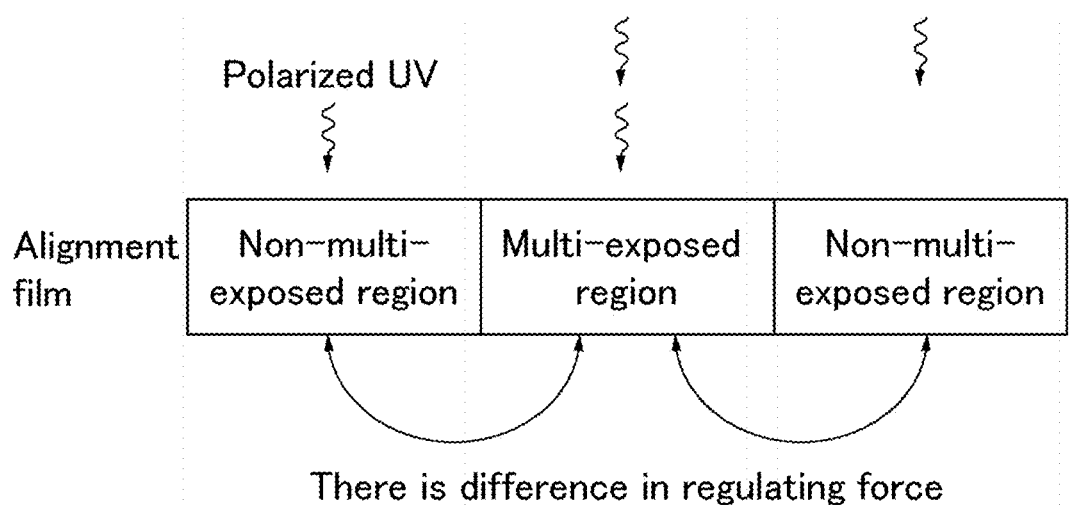
FIG. 34 is a schematic view showing the relationship between multi-exposure and alignment regulating force.

In the non-multi-exposed regions A and B, the difference in contrast ratio from the central portion of the optical element 10 was as small as about 0.4, and there was no variation in depolarization property. In each of the multi-exposed regions C, D, and E, the difference in contrast ratio from the central portion of the optical element 10 was found to be larger than the differences in the non-multi-exposed regions A and B. These results show that the depolarization property varies between the multi-exposed regions and the non-multi-exposed regions. This is presumably because, as shown in FIG. 34, the conditions of polarized UV light applied to the photoalignment film vary according to whether multi-exposure is performed or not, which leads to different alignment regulating forces across the alignment film. Thus, including regions with different depolarization properties was found to be a characteristic of an optical element (PBOE) produced through multi-exposure. FIG. 34 is a schematic view showing the relationship between multi-exposure and alignment regulating force.

FIG. 29 to FIG. 34 show that the optically anisotropic layer 300 in the optical element 10 of Example 1 alternately had a region with a depolarization property of 0 or greater and smaller than 1 and a region with a depolarization property of 1 or greater and 10 or smaller.

<Measurement (Actual Measurement) of Diffraction Efficiency>

Figure 35:
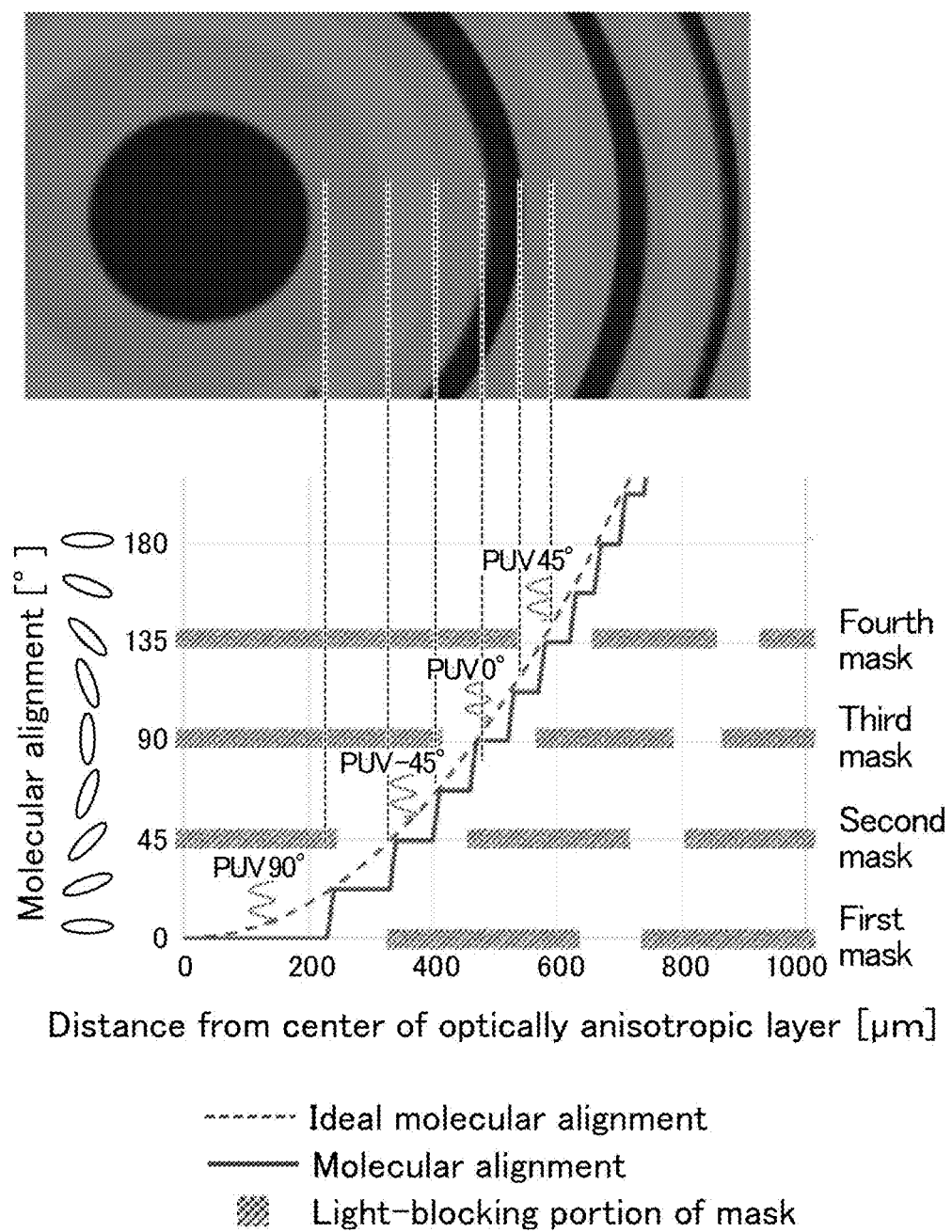
FIG. 35 shows a polarizing micrograph of the optical element of Example 1 and a schematic cross-sectional view of masks used in the production of the optical element of Example 1.
Figure 36:
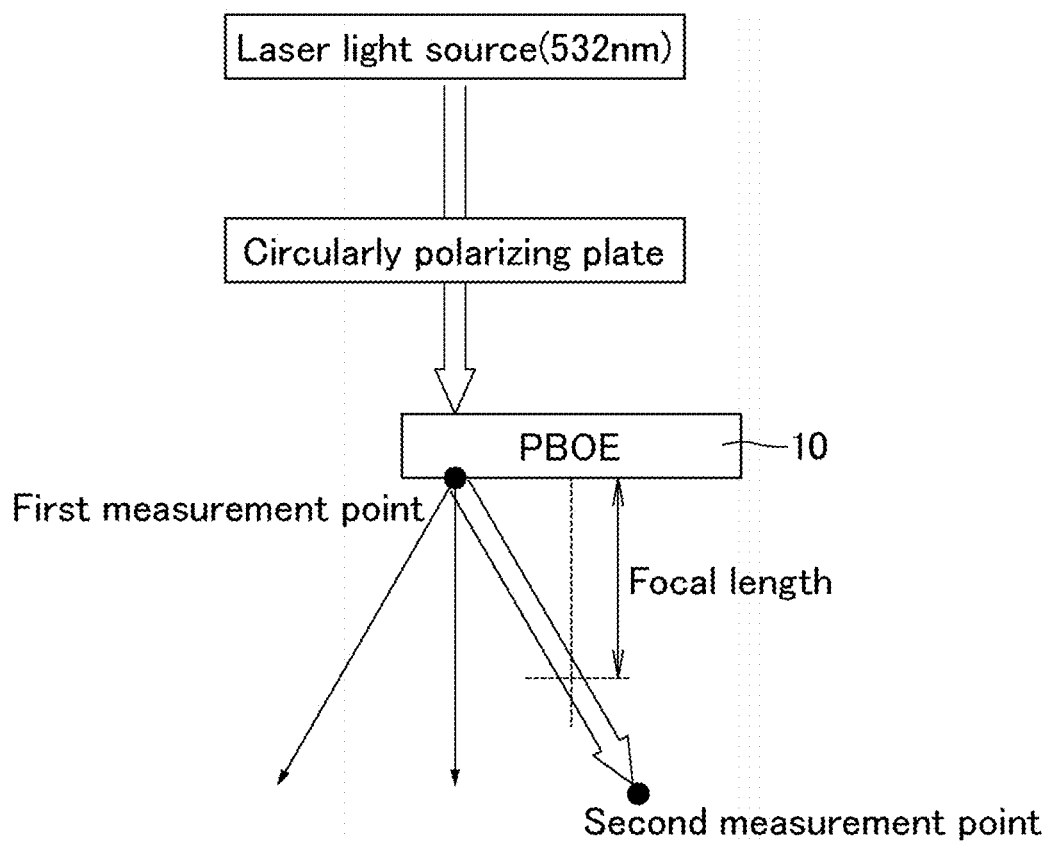
FIG. 36 is a schematic view showing a method of measuring diffraction efficiency.

FIG. 35 shows a polarizing micrograph of the optical element of Example 1 and a schematic cross-sectional view of masks used in the production of the optical element of Example 1. FIG. 36 is a schematic view showing a method of measuring diffraction efficiency.

The diffraction efficiency of the optical element 10 of Example 1 shown in FIG. 35 was measured. The diffraction efficiency measurement was in the configuration shown in FIG. 36 using a laser light source having a wavelength of 532 nm. In the diffraction efficiency measurement, light emitted from the laser light source first passes through a circularly polarizing plate to be circularly polarized light, and is then emitted toward the optical element 10. Principal light of the light having passed through the outer periphery of the optical element 10 travels toward the focal point. Meanwhile, unnecessary light such as the zeroth-order light is diffracted in a different direction from the principal light. The diffraction efficiency is defined by the following Equation (1).

Diffraction efficiency = (Principal light intensity) (Equation 1)

+(Total transmission light intensity)×100

Thus, the light intensity was measured at the first measurement point and the second measurement point shown in FIG. 36. The light intensity measured at the first measurement point was taken as the total transmission light intensity. The light intensity measured at the second measurement point was taken as the principal light intensity. The diffraction efficiency was calculated from these measurement values using the Equation (1). As a result of the calculation, the diffraction efficiency (actually measured) of the optical element 10 of Example 1, having 8 types of molecular alignments as shown in FIG. 35, was 95%.

<Calculation of Diffraction Efficiency>

Figure 37:
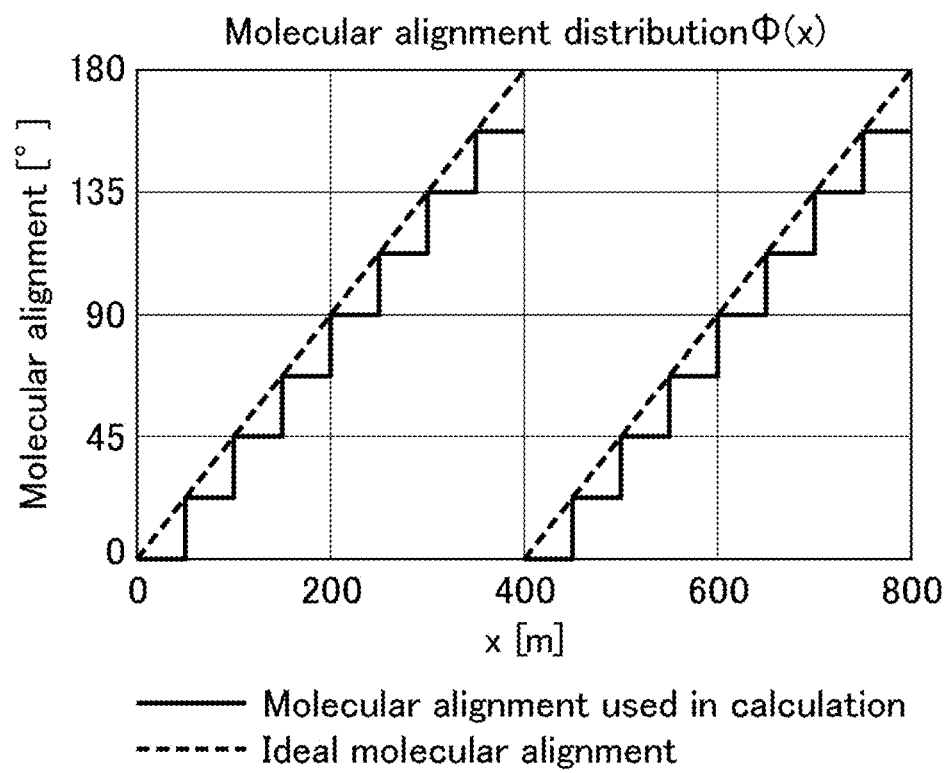
FIG. 37 shows the molecular alignments used in calculation of the diffraction efficiency of an optical element of a reference example.

FIG. 37 shows the molecular alignments used in calculation of the diffraction efficiency of an optical element of a reference example. The 8 types of molecular alignments of the optical element 10 of Example 1 can be modeled as shown in the reference example in FIG. 37. Based on the molecular alignments shown in FIG. 37, the diffraction efficiency of the optical element of the reference example was simulated. The optical element used in the simulation was, as shown in FIG. 37, a one-dimensional diffraction grating having 8 types of molecular alignments of 0°, 22.5°, 45°, 67.5°, 90°, 112.5°, 135°, and 157.5°.

The diffraction efficiency of the optical element (PBOE) can be calculated using the Fraunhofer diffraction once the molecular alignments are determined. The calculation equation of the diffraction efficiency n is the following Equation (2). In the following Equation (2), Λ represents a period on the x-axis and Φ(x) represents a molecular alignment in FIG. 37. Here, the PBOE, which is an optical element, has a molecular alignment that is periodical in the x-axis direction. This period is taken as Λ[m]. Affecting the angle of diffraction but not affecting the diffraction efficiency, Λ was set to an appropriate value in the present calculation.

[Math. 2]

$$\eta = \left| \frac{1}{\Lambda} \int_0^\Lambda \exp\left\{ \frac{i\pi\Phi(x)}{90} \right\} \exp\left( -i\frac{2\pi x}{\Lambda} \right) dx \right|^2 \quad \text{(Equation 2)}$$

The diffraction efficiency (calculated) of the optical element of the reference example calculated from the Equation (2) was 95%.

<Evaluation of Actually Measured Diffraction Efficiency and Calculated Diffraction Efficiency>

The following Table 3 shows the actually measured diffraction efficiency of the optical element of Example 1 and the calculated diffraction efficiency of the optical element of the reference example.

TABLE 3

|  | Example 1 (actually measured) | Reference example (calculated) |
| --- | --- | --- |
| Type of molecular alignment | 8 types | 8 types |
| Diffraction efficiency | 95% | 95% |

Table 3 confirmed that the actually measured diffraction efficiency of the optical element 10 of Example 1 having 8 types of molecular alignments matched the calculated diffraction efficiency of the optical element of the reference example. While production of the optical element 10 having 8 types of molecular alignments as in Example 1 should require 8 masks, Example 1 achieved the equivalent performance merely with 4 masks.

Examples 2 to 5

Figure 38:
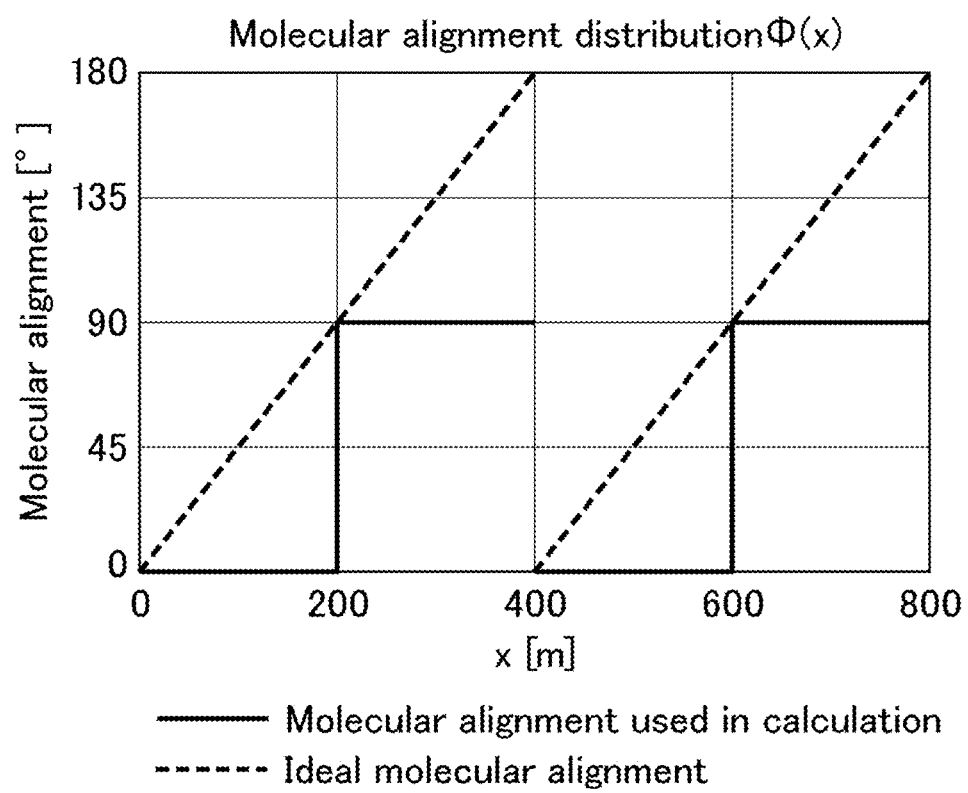
FIG. 38 shows the molecular alignments of an optical element of Example 2 having 2 types of molecular alignments.
Figure 39:
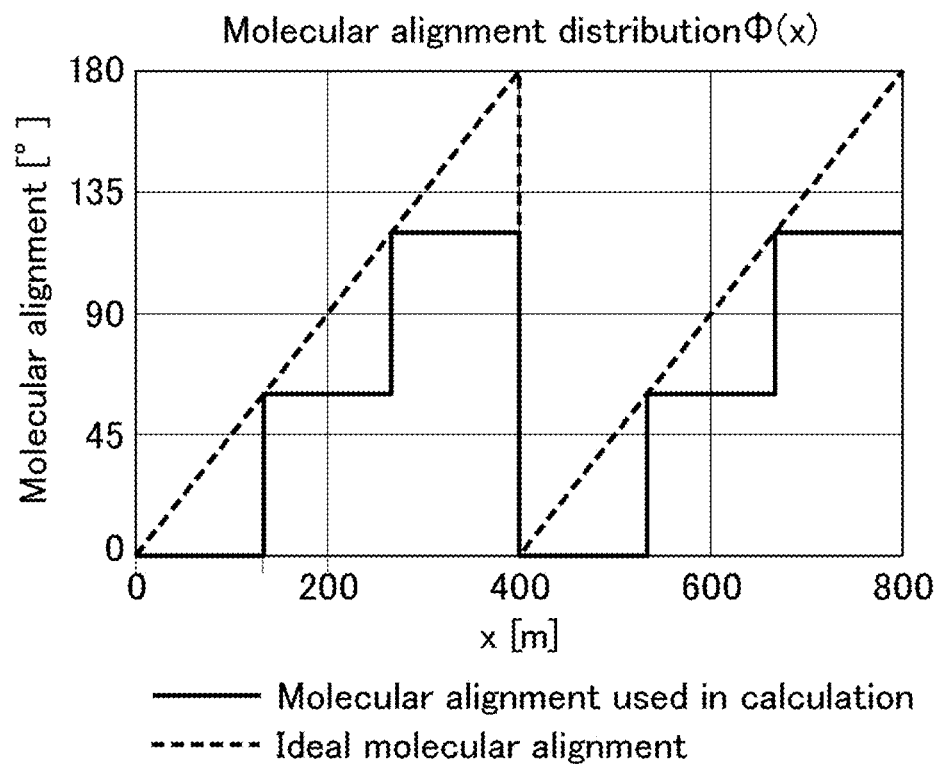
FIG. 39 shows the molecular alignments of an optical element of Example 3 having 3 types of molecular alignments.
Figure 40:
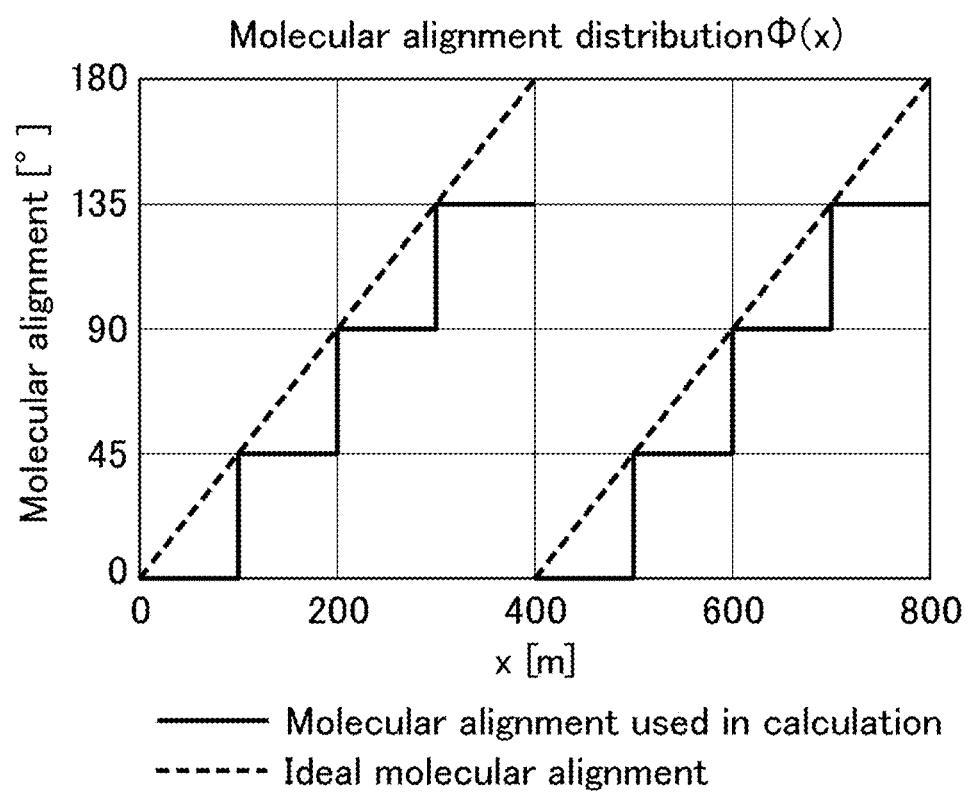
FIG. 40 shows the molecular alignments of an optical element of Example 4 having 4 types of molecular alignments.
Figure 41:
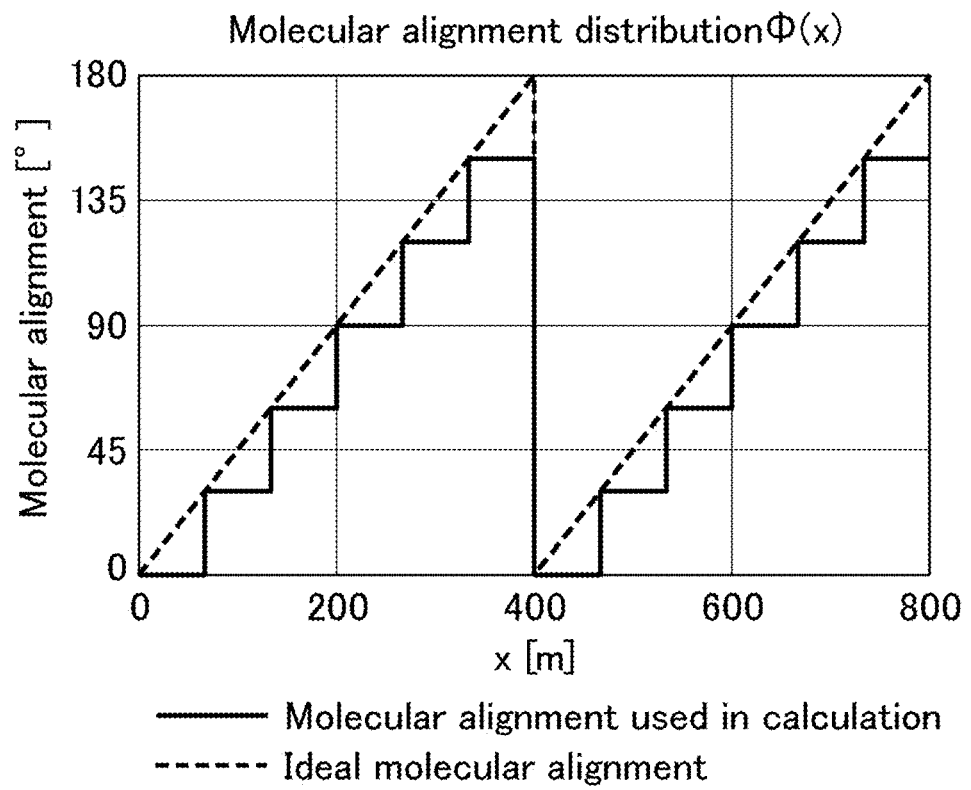
FIG. 41 shows the molecular alignments of an optical element of Example 5 having 6 types of molecular alignments.
Figure 42:
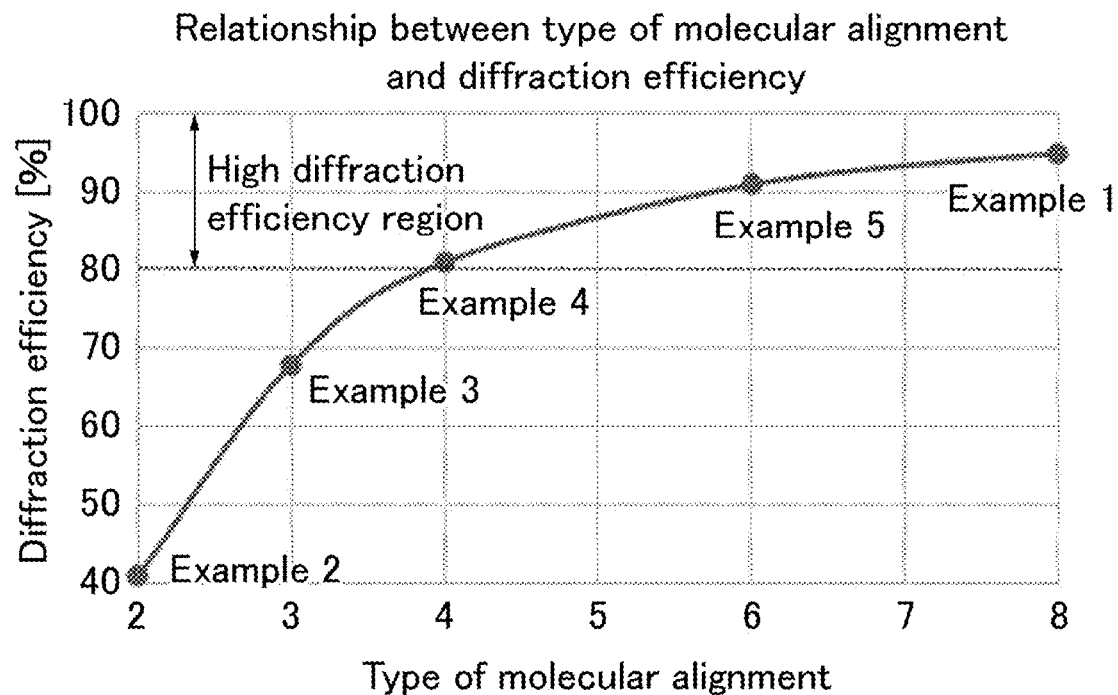
FIG. 42 is a graph showing the diffraction efficiencies of the optical elements of Example 1 to Example 5.
Figure 43:
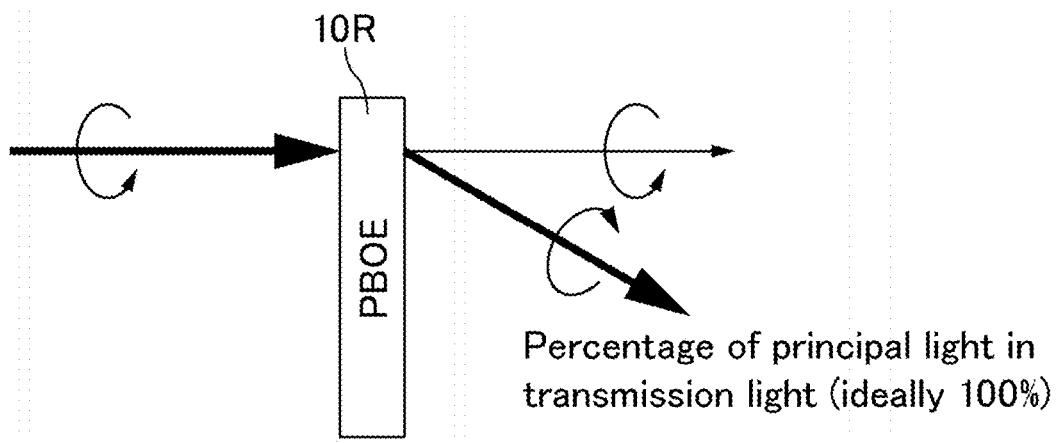
FIG. 43 is a schematic view showing a method of measuring the diffraction efficiency of the PBOE of a comparative embodiment.
Figure 44:
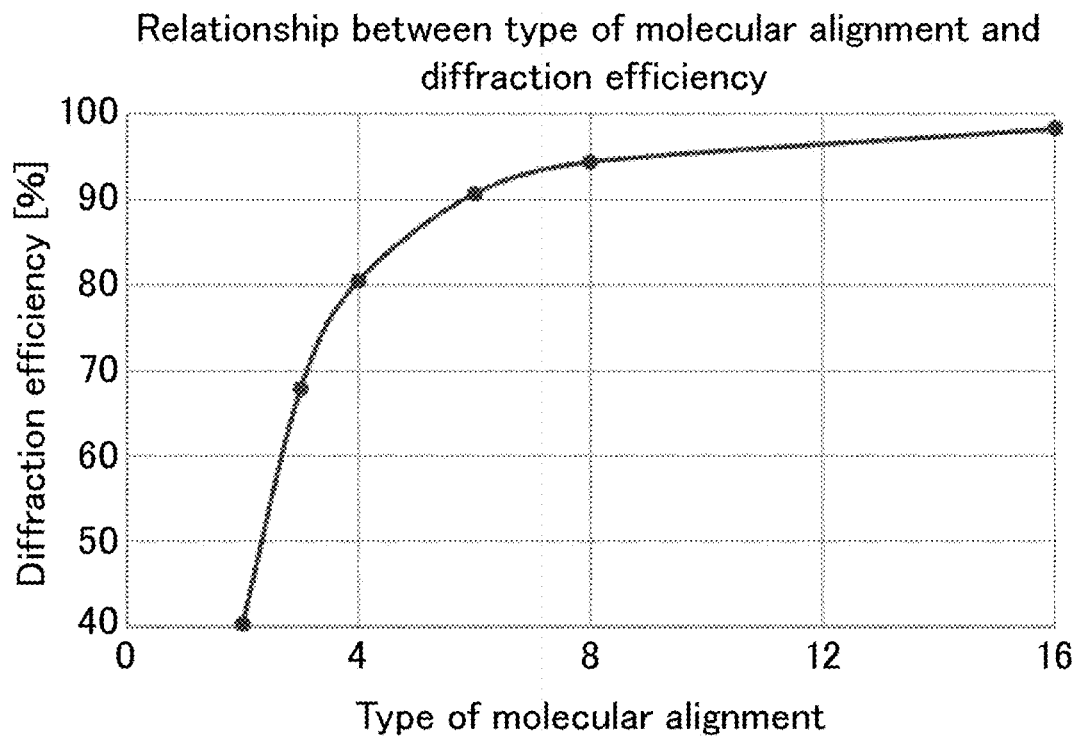
FIG. 44 is a graph of the relationship between the type of molecular alignment and the diffraction efficiency of the PBOE of the comparative embodiment.
Figure 45:
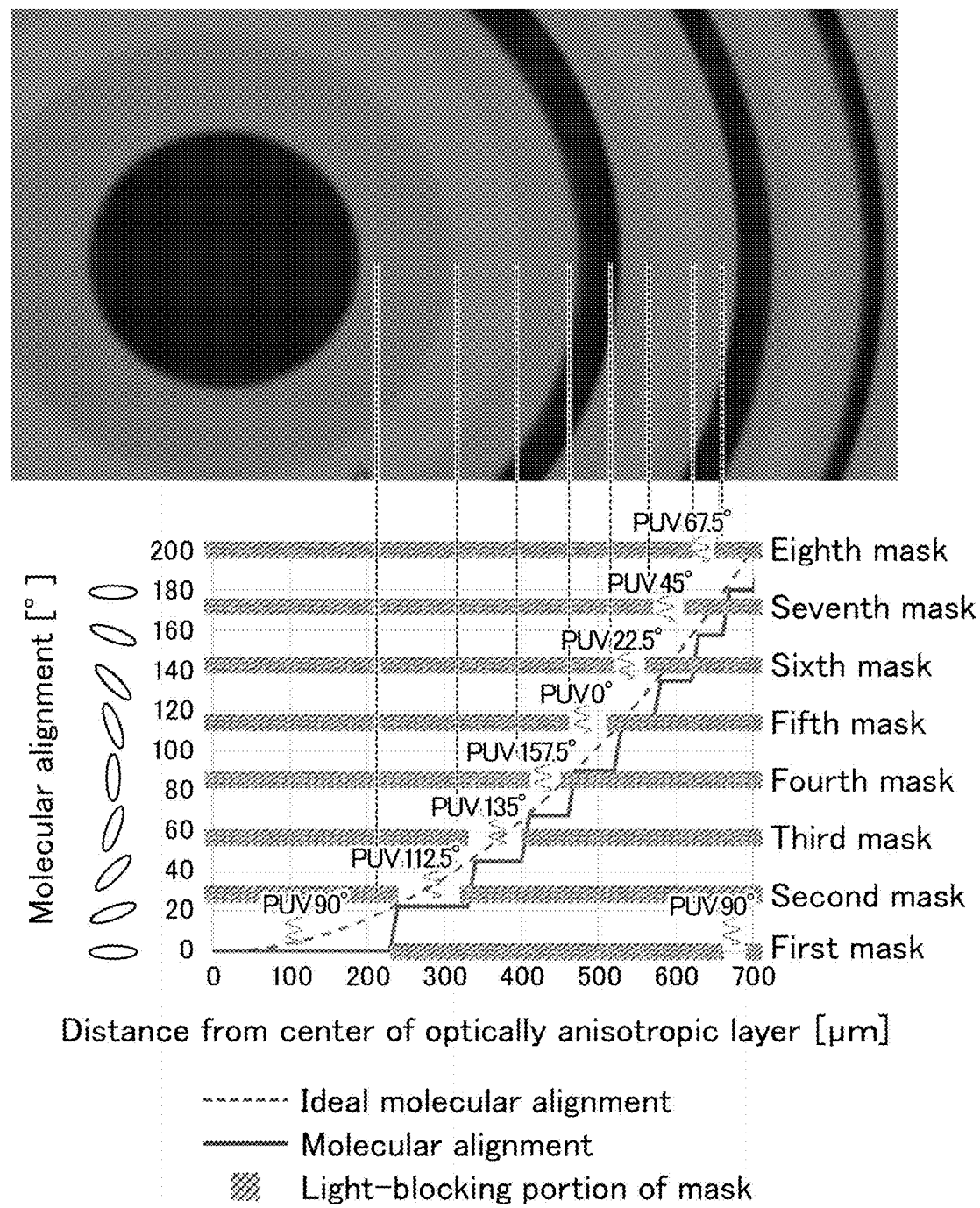
FIG. 45 shows a polarizing micrograph of the PBOE of the comparative embodiment having 8 types of molecular alignments and a schematic cross-sectional view of masks required in production of the PBOE.
Figure 46:
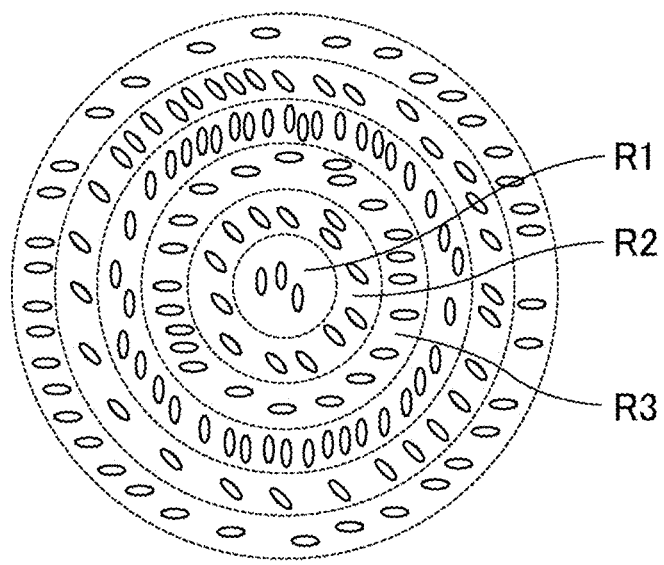
FIG. 46 is a schematic plan view of the optical element of JP H09-197363 A.

FIG. 38 shows the molecular alignments of an optical element of Example 2 having 2 types of molecular alignments. FIG. 39 shows the molecular alignments of an optical element of Example 3 having 3 types of molecular alignments. FIG. 40 shows the molecular alignments of an optical element of Example 4 having 4 types of molecular alignments. FIG. 41 shows the molecular alignments of an optical element of Example 5 having 6 types of molecular alignments. FIG. 42 is a graph showing the diffraction efficiencies of the optical elements of Example 1 to Example 5.

Using the same method as the calculation of the diffraction efficiency in Example 1, the diffraction efficiencies of the optical elements of Examples 2 to 5 in FIG. 38 to FIG. 41 were calculated to consider the relationship between the type of molecular alignment and the diffraction efficiency (calculated). The optical element of Example 2 shown in FIG. 38 had 2 types of molecular alignments of 0° and 90°. The optical element of Example 3 shown in FIG. 39 had 3 types of molecular alignments of 0°, 60°, and 120°. The optical element of Example 4 shown in FIG. 40 had 4 types of molecular alignments of 0°, 45°, 90°, and 135°. The optical element of Example 5 shown in FIG. 41 had 6 types of molecular alignments of 0°, 30°, 60°, 90°, 120°, and 150°. The following Table 4 and FIG. 42 show the calculation results of the diffraction efficiencies of the optical elements of Examples 2 to 5.

TABLE 4

|  | Example 2 | Example 3 | Example 4 | Example 5 | Example 1 |
| --- | --- | --- | --- | --- | --- |
| Type of molecular alignment | 2 types | 3 types | 4 types | 6 types | 8 types |
| Diffraction efficiency | 41% | 68% | 81% | 91% | 95% |

As shown in Table 4 and FIG. 42, with 4 or more types of molecular alignments, especially high diffraction efficiencies of 80% or higher were successfully achieved.

REFERENCE SIGNS LIST

1: light source 2, 3: polarizing plate

4: camera

10: optical element

10R: PBOE (Pancharatnam-Berry phase optical element)

20, 20R: mask set $20_1, 20_2, 20_3, 20_4, 20_M, 20_r, 20_{r-1}, 20_{r-2}, 20R_1, 20R_2, 20R_3,$ $20R_4$: mask $20A_1, 20A_2, 20A_3, 20A_4, 20A_r, 20A_{r-1}, 20A_{r-2}, 20RA_1, 20RA_2,$ $20RA_3, 20RA_4$: light-transmitting portion (aperture portion)

$20B_1, 20B_2, 20B_3, 20B_4, 20B_r, 20B_{r-1}, 20B_{r-2}, 20RB_1, 20RB_2,$ $20RB_3, 20RB_4$: light-blocking portion $30_1, 30_2, 30_3, 30_N, 30_p, 30_{p+1}, 31_1, 31_2, 31_3, 31_N, 31_p, 31_{p+1}$, A, B, C, D, E, R1, R2, R3: region 100: supporting substrate 200: alignment film 300: optically anisotropic layer 310: anisotropic molecules $D_1, D_2, D_3, D_N$: direction

What is claimed is:

1. An optical element comprising
an optically anisotropic layer containing anisotropic molecules,
the optically anisotropic layer comprising
a first region that is a region where the anisotropic molecules are not twist-aligned in a film thickness direction of the optically anisotropic layer, and
a second region that is a region where the anisotropic molecules are twist-aligned in the film thickness direction of the optically anisotropic layer; wherein
the optically anisotropic layer further includes a third region that is a region where the anisotropic molecules are not twist-aligned in the film thickness direction of the optically anisotropic layer in addition to the first region and the second region; and
the first region, the second region, and the third region are arranged in the stated order along the direction from a central portion to an end portion of the optically anisotropic layer in a plan view.

2. An optical element comprising
an optically anisotropic layer containing anisotropic molecules,
the optically anisotropic layer comprising
a first region that is a region where the anisotropic molecules are not twist-aligned in a film thickness direction of the optically anisotropic layer, and
a second region that is a region where the anisotropic molecules are twist-aligned in the film thickness direction of the optically anisotropic layer; wherein
the optically anisotropic layer further includes a third region to an N-th region in addition to the first region and the second region,
the first region to the N-th region are arranged in the stated order along the direction from a central portion to an end portion of the optically anisotropic layer in a plan view,
a p-th region included in the first region to the N-th region is a region where the anisotropic molecules are not twist-aligned in the film thickness direction of the optically anisotropic layer,
a (p+1)th region included in the first region to the N-th region is a region where the anisotropic molecules are twist-aligned in the film thickness direction of the optically anisotropic layer,
N is an integer of 4 or greater, and
p is an odd number of 1 or greater and (N−1) or smaller.

3. The optical element according to claim 1,
wherein the region where the anisotropic molecules are not twist-aligned is a region where a difference between a front side molecular alignment and a back side molecular alignment in the optically anisotropic layer is 0° or more and less than 0.1°, and
the region where the anisotropic molecules are twist-aligned is a region where a difference between the front side molecular alignment and the back side molecular alignment of the optically anisotropic layer is 0.1° or more.

4. The optical element according to claim 1,
wherein the first region and the second region are arranged in an annular pattern.

5. The optical element according to claim 1,
wherein the optical element is a Pancharatnam-Berry phase optical element.

* * * * *